(12) United States Patent
Byun et al.

(10) Patent No.: US 10,234,599 B2
(45) Date of Patent: Mar. 19, 2019

(54) ANTI-REFLECTIVE FILM

(71) Applicant: LG CHEM, LTD., Seoul (KR)

(72) Inventors: Jin Seok Byun, Daejeon (KR); Jae Young Kim, Daejeon (KR); Yeong Rae Chang, Daejeon (KR); Boo Kyung Kim, Daejeon (KR); Seok Hoon Jang, Daejeon (KR)

(73) Assignee: LG CHEM, LTD., Seoul (KR)

( * ) Notice: Subject to any disclaimer, the term of this patent is extended or adjusted under 35 U.S.C. 154(b) by 0 days.

(21) Appl. No.: 15/668,437

(22) Filed: Aug. 3, 2017

(65) Prior Publication Data

US 2018/0017713 A1 Jan. 18, 2018

Related U.S. Application Data

(63) Continuation of application No. PCT/KR2017/007245, filed on Jul. 6, 2017.

(30) Foreign Application Priority Data

Jul. 14, 2016 (KR) .................. 10-2016-0089377
Apr. 21, 2017 (KR) .................. 10-2017-0051842

(51) Int. Cl.
*G02B 1/11* (2015.01)
*G02B 1/111* (2015.01)
*C08F 20/18* (2006.01)
*C08J 5/18* (2006.01)
*C08J 7/04* (2006.01)
(Continued)

(52) U.S. Cl.
CPC .............. *G02B 1/111* (2013.01); *C08F 20/18* (2013.01); *C08J 5/18* (2013.01); *C08J 7/04* (2013.01);
(Continued)

(58) Field of Classification Search
CPC .. G02B 1/111; G02B 1/14; G02B 1/11; G02B 1/113
(Continued)

(56) References Cited

U.S. PATENT DOCUMENTS 9,046,645 B2 * 6/2015 Hayashi ................. G02B 1/111
2008/0032053 A1 2/2008 Kourtakis et al.
(Continued)

FOREIGN PATENT DOCUMENTS

EP 3251832 A1 12/2017
JP 2007272131 A 10/2007
(Continued)

OTHER PUBLICATIONS

Extended European Search Report issued for European Patent Application No. 17751980.8 dated Nov. 16, 2018, 8 pages.

*Primary Examiner* — William R Alexander
(74) *Attorney, Agent, or Firm* — Rothwell, Figg, Ernst & Manbeck, P.C.

(57) ABSTRACT

Disclosed herein is an anti-reflective film comprising: a hard coating layer; and a low-refractive layer containing a binder resin and hollow inorganic nanoparticles and solid inorganic nanoparticles which are dispersed in the binder resin, wherein a ratio of an average particle diameter of the solid inorganic nanoparticles to an average particle diameter of the hollow inorganic nanoparticles is 0.26 to 0.55, and wherein at least 70 vol % of the entire solid inorganic nanoparticles are present within a distance corresponding to 50% of an entire thickness of the low-refractive layer from the interface between the hard coating layer and the low-refractive layer, and an anti-reflective film comprising: a hard coating layer containing a binder resin containing a photocurable resin, and organic or inorganic fine particles dispersed in the binder resin; and a low-refractive layer containing a binder resin and hollow inorganic nanoparticles and solid inorganic nanoparticles which are dispersed in the binder resin, wherein a ratio of an average particle diameter of the solid inorganic nanoparticles to an average particle diameter of the hollow inorganic nanoparticles is 0.15 to 0.55, and wherein at least 70 vol % of the entire solid
(Continued)

inorganic nanoparticles are present within a distance corresponding to 50% of an entire thickness of the low-refractive layer from the interface between the hard coating layer and the low-refractive layer.

25 Claims, 8 Drawing Sheets

(51) Int. Cl.
    *C08L 33/06*     (2006.01)
    *C08L 33/10*     (2006.01)
    *C08L 83/06*     (2006.01)
    *G02B 1/14*     (2015.01)
    *C09D 4/00*     (2006.01)

(52) U.S. Cl.
    CPC .............. *C08L 33/06* (2013.01); *C08L 33/10* (2013.01); *C08L 83/06* (2013.01); *C09D 4/00* (2013.01); *G02B 1/11* (2013.01); *G02B 1/14* (2015.01)

(58) Field of Classification Search
    USPC .......................................................... 359/601
    See application file for complete search history.

(56) References Cited

U.S. PATENT DOCUMENTS

| | | | |
|---|---|---|---|
| 2009/0202819 A1* | 8/2009 | Asahi | G02B 1/111 428/336 |
| 2010/0196687 A1 | 8/2010 | Isono et al. | |
| 2011/0080645 A1* | 4/2011 | Tsuno | G02B 5/0242 359/599 |
| 2012/0200933 A1 | 8/2012 | Akiyama et al. | |
| 2013/0143028 A1 | 6/2013 | Asahi et al. | |
| 2013/0215514 A1 | 8/2013 | Kim et al. | |
| 2013/0216729 A1 | 8/2013 | Kim et al. | |
| 2013/0216817 A1 | 8/2013 | Kim et al. | |
| 2013/0216819 A1 | 8/2013 | Kim et al. | |
| 2013/0222915 A1 | 8/2013 | Kim et al. | |
| 2015/0301231 A1* | 10/2015 | Yang | G02B 1/105 428/313.9 |
| 2016/0115340 A1* | 4/2016 | Hashimoto | B32B 7/02 428/143 |
| 2018/0231688 A1* | 8/2018 | Byun | G02B 1/111 |

FOREIGN PATENT DOCUMENTS

| | | | | |
|---|---|---|---|---|
| JP | 2009-217258 A | | 9/2009 | |
| JP | 2011-088787 A | * | 5/2011 | ............. C03C 17/30 |
| JP | 4792305 B2 | | 10/2011 | |
| JP | 2014-095890 A | * | 5/2014 | ............. G02B 1/10 |
| KR | 10-2009-0046873 A | | 5/2009 | |
| KR | 10-2010-0039869 A | | 4/2010 | |
| KR | 10-2012-0093212 A | | 8/2012 | |
| KR | 10-1189196 B1 | | 10/2012 | |
| KR | 10-2013-0140122 A | | 12/2013 | |
| KR | 20140006922 A | * | 1/2014 | ............. G02B 1/110 |
| KR | 10-2014-0037080 A | | 3/2014 | |
| KR | 10-1548313 B1 | | 8/2015 | |
| WO | 2017/078428 A1 | | 5/2017 | |

* cited by examiner

[FIG. 1]
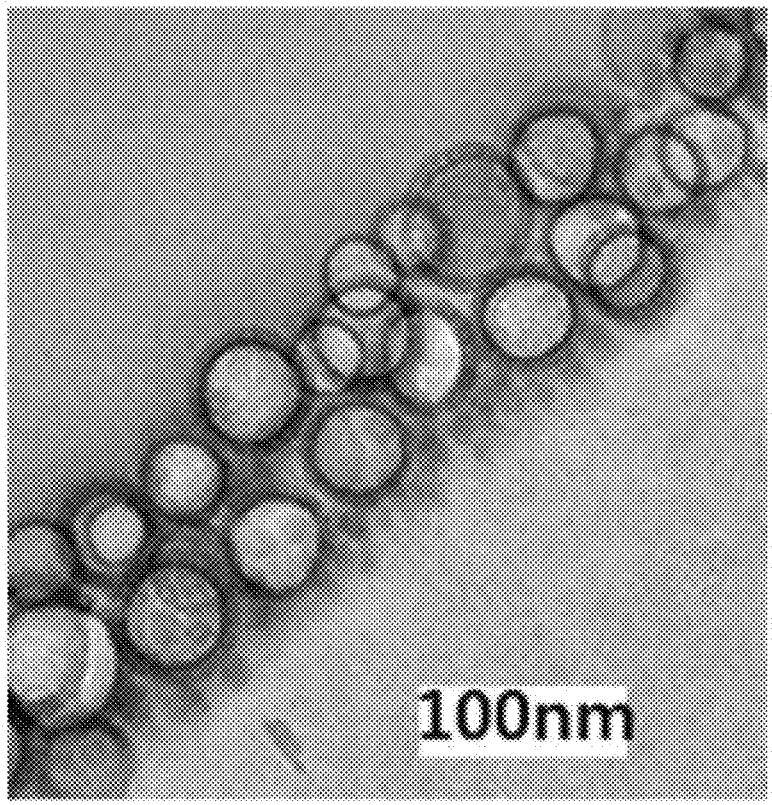

[FIG. 2]
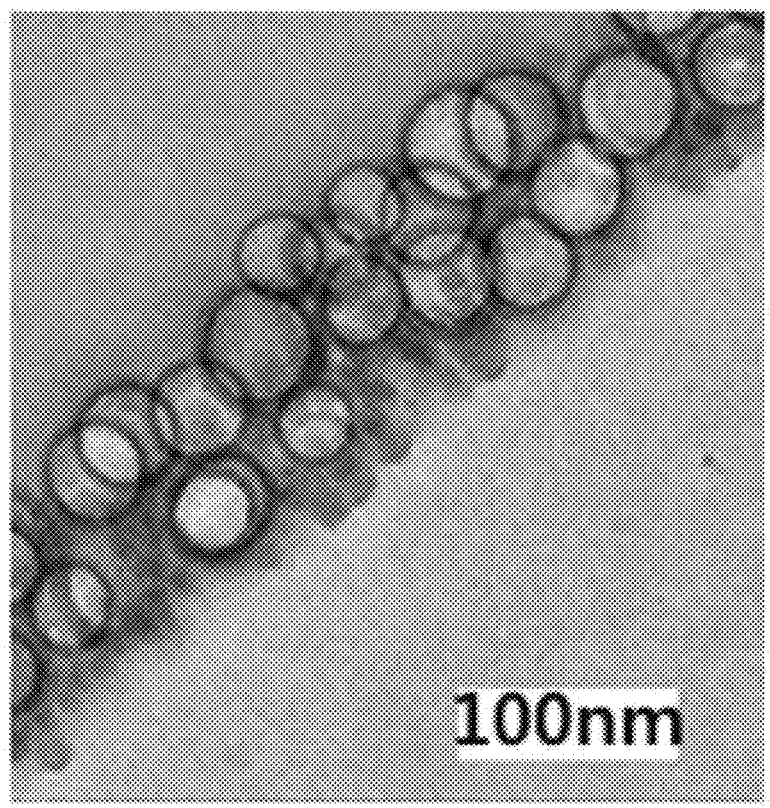

[FIG. 3]
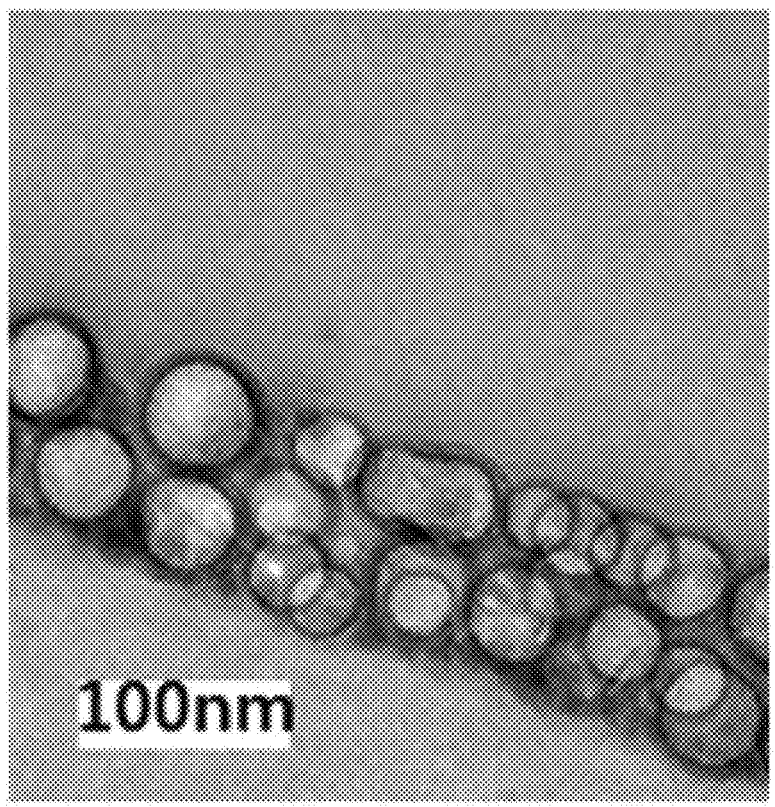

[FIG. 4]
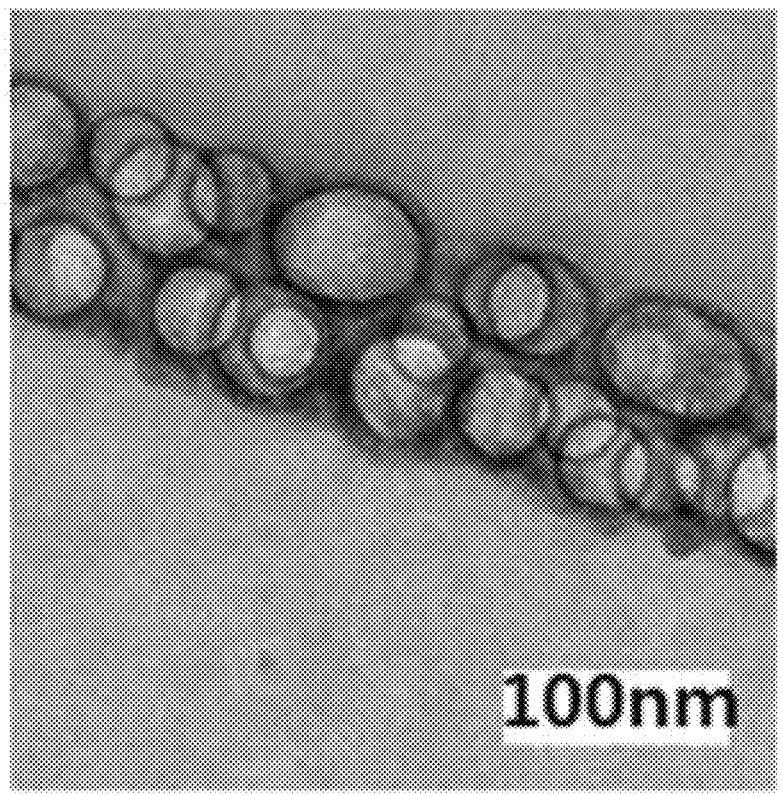

[FIG. 5]
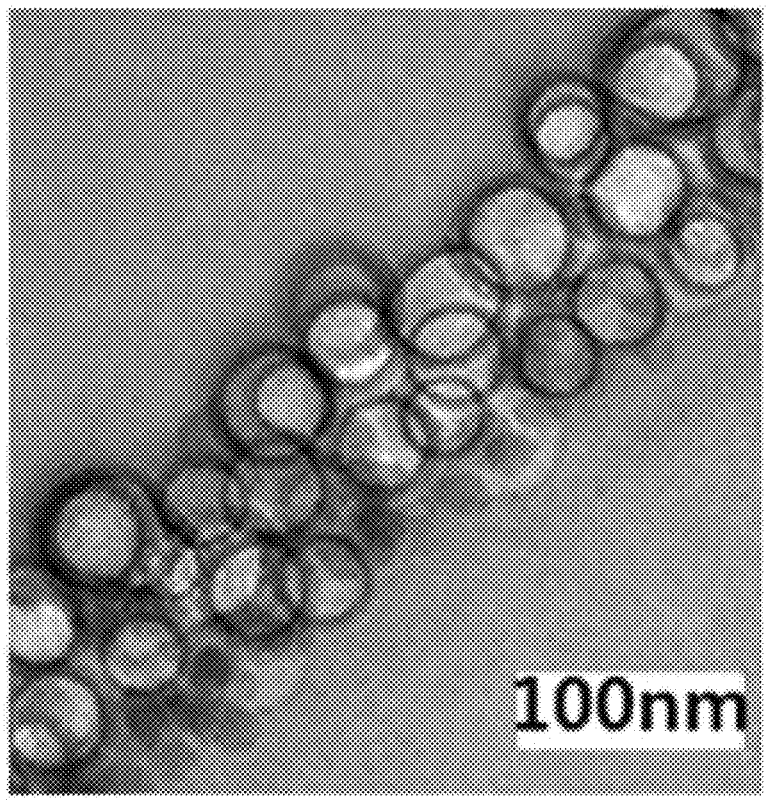

[FIG. 6]
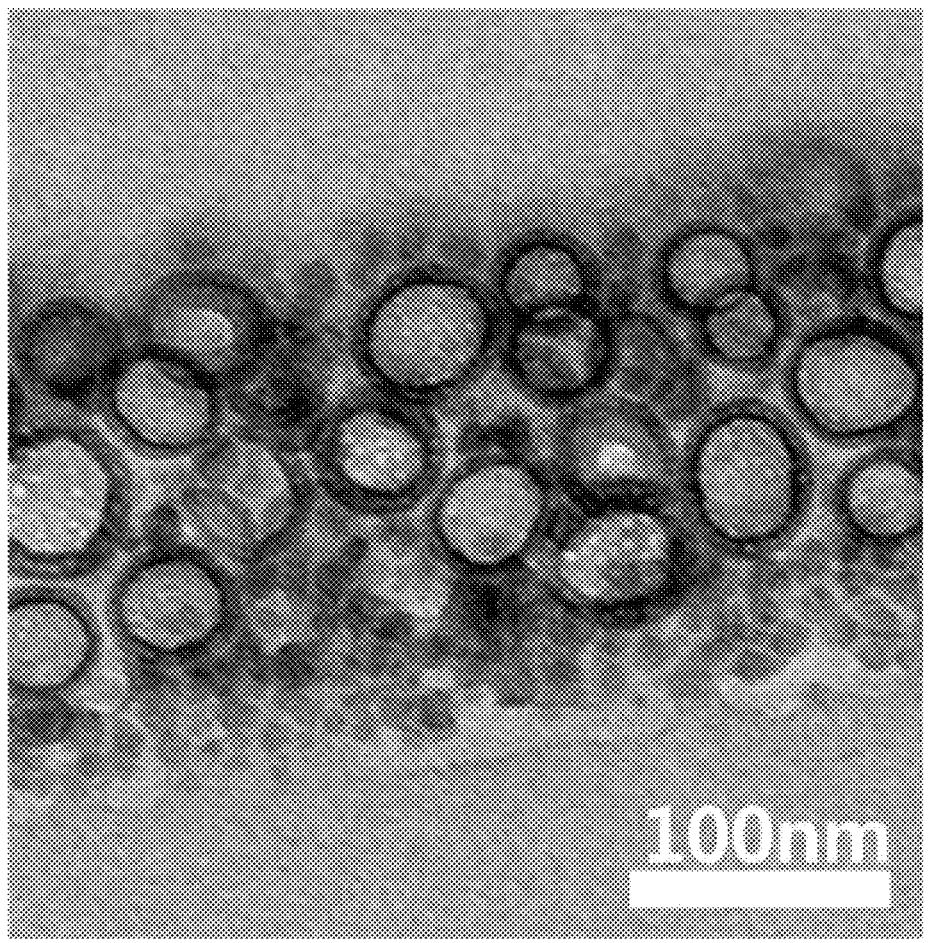

[FIG. 7]
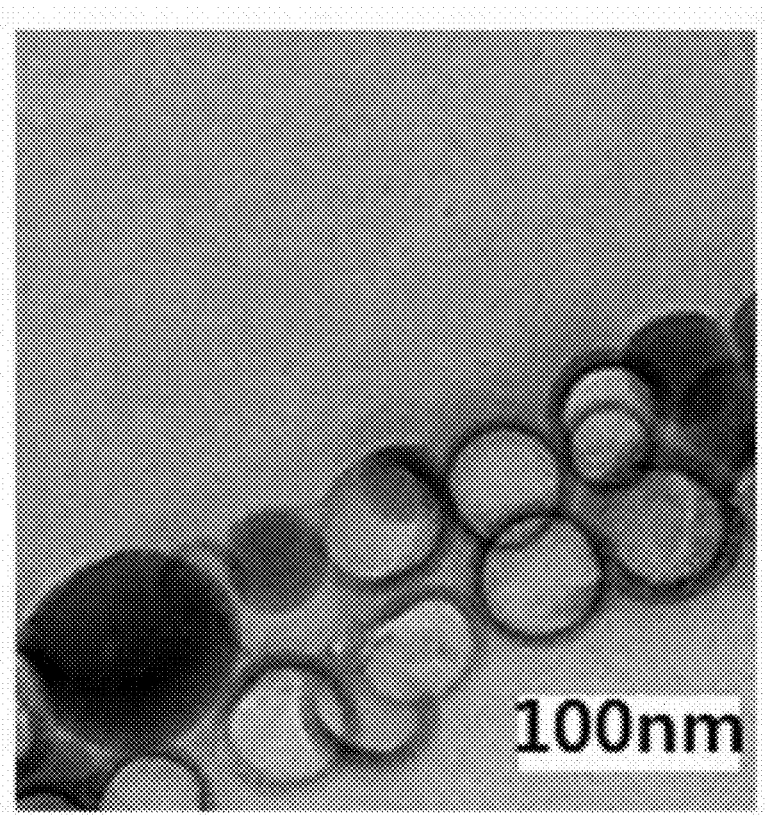

[FIG. 8]
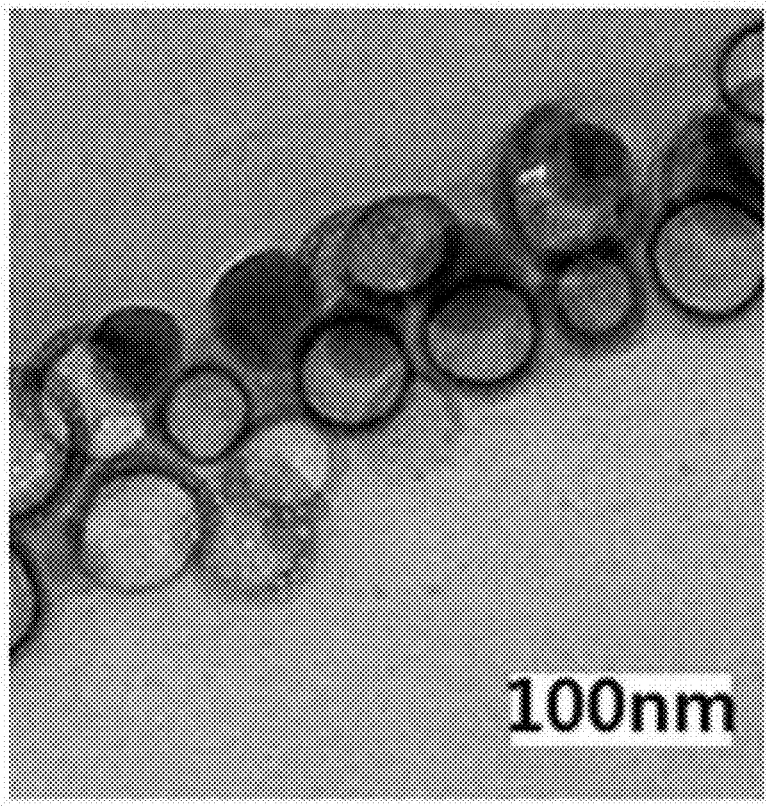

ANTI-REFLECTIVE FILM

CROSS-REFERENCE TO RELATED APPLICATION

This application is a Continuation Bypass of International Application No. PCT/KR2017/007245, filed Jul. 6, 2017, and claims the benefit of Korean Application No. 10-2016-0089377, filed on Jul. 14, 2016, and Korean Application No. 10-2017-0051842, filed on Apr. 21, 2017, all of which are hereby incorporated by reference in their entirety for all purposes as if fully set forth herein.

FIELD OF THE INVENTION

The present invention relates to an anti-reflective film. More particularly, the present invention relates to an anti-reflective film capable of having a low reflectance and a high light transmittance, simultaneously implementing high scratch-resistance and anti-pollution property, and enhancing sharpness of a screen of a display device.

BACKGROUND OF THE INVENTION

In general, an anti-reflective film is mounted on a flat-panel display device such as a plasma display panel (PDP), a liquid crystal display (LCD), and the like, in order to minimize reflection of light incident from the outside.

As a method for minimizing reflection of light, there are a method of dispersing fillers such as inorganic fine particles in a resin and coating the resin on a substrate film to impart unevenness (i.e. anti-glare (AG) coating method), a method of forming a plurality of layering having different refractive indices on a substrate film to use light interference (i.e. anti-reflection (AR) coating method), or a combination of these methods, and the like.

Among them, in the case of the AG coating method, an absolute amount of reflected light is equivalent to that in a general hard coating, but it is possible to obtain a low-reflection effect by decreasing an amount of light entering the eyes using scattering of the light through unevenness. However, since in the AG coating method, sharpness of a screen is deteriorated due to an uneven surface, recently, the AR coating method has been variously studied.

As a film using the AR coating method, a film having a multilayer structure in which a hard coating layer (high-refractive index layer), a low-reflective coating layer, and the like, are laminated on a substrate film has been commercialized. However, in the method of forming a plurality of layers as described above, since a process of forming each of the layers is separately performed, interlayer close adhesion (interfacial adhesion) may be weak, such that scratch resistance may be deteriorated.

Further, in order to improve scratch resistance of the low-refractive layer included in the anti-reflective film, a method of adding various particles with a nanometer size (for example, silica particles, alumina particle, zeolite particles, or the like) was mainly conducted in the past. However, in the case of using the particles with a nanometer size, it was difficult to increase scratch resistance while decreasing a reflectance of the low-refractive layer, and an anti-pollution property of a surface of the low-refractive layer was significantly deteriorated due to the particles with the nanometer size.

Therefore, various studies for decreasing an absolute reflection amount of light incident from the outside and improving an anti-pollution property together with scratch resistance of a surface have been conducted, but physical properties of an anti-reflective film are not sufficiently improved in spite of these studies.

DETAILED DESCRIPTION OF THE INVENTION

Technical Problem

The present invention has been made in an effort to provide an anti-reflective film having advantages of having a low reflectance and a high light transmittance, simultaneously implementing high scratch resistance and anti-pollution property, and enhancing sharpness of a screen of a display device.

Technical Solution

There is provided an anti-reflective film comprising: a hard coating layer; and a low-refractive layer containing a binder resin and hollow inorganic nanoparticles and solid inorganic nanoparticles which are dispersed in the binder resin, wherein a ratio of an average particle diameter of the solid inorganic nanoparticles to an average particle diameter of the hollow inorganic nanoparticles is 0.26 to 0.55, and wherein at least 70 vol % of the entire solid inorganic nanoparticles are present within a distance corresponding to 50% of an entire thickness of the low-refractive layer from the interface between the hard coating layer and the low-refractive layer.

There also is provided an anti-reflective film comprising: a hard coating layer containing a binder resin containing a photocurable resin, and organic or inorganic fine particles dispersed in the binder resin; and a low-refractive layer containing a binder resin and hollow inorganic nanoparticles and solid inorganic nanoparticles which are dispersed in the binder resin, wherein a ratio of an average particle diameter of the solid inorganic nanoparticles to an average particle diameter of the hollow inorganic nanoparticles is 0.15 to 0.55, and wherein at least 70 vol % of the entire solid inorganic nanoparticles are present within a distance corresponding to 50% of an entire thickness of the low-refractive layer from the interface between the hard coating layer and the low-refractive layer.

Hereinafter, the anti-reflective film according to the exemplary embodiments of the present invention will be described in more detail.

As used herein, the term "photopolymerizable compound" collectively refers to compounds causing a polymerization reaction when light, for example, visible light or UV light is irradiated thereto.

In addition, the term "fluorine-containing compound" refers to a compound in which at least one fluorine element is contained.

Further, the term "(meth)acryl" is used as a concept including both acryl and methacryl.

In addition, the term "(co)polymer" is used as a concept including both a co-polymer and a homo-polymer.

Further, the term "hollow silica particles", which means silica particles derived from silicon compounds or organic silicon compounds, means particles in a shape in which an empty space is present on surfaces and/or the insides of silica particles.

According to the exemplary embodiment of the present invention, there is provided an anti-reflective film comprising: a hard coating layer; and a low-refractive layer containing a binder resin and hollow inorganic nanoparticles and solid inorganic nanoparticles which are dispersed in the binder resin, wherein a ratio of an average particle diameter of the solid inorganic nanoparticles to an average particle diameter of the hollow inorganic nanoparticles is 0.26 to 0.55, and wherein at least 70 vol % of the entire solid inorganic nanoparticles are present within a distance corresponding to 50% of an entire thickness of the low-refractive layer from the interface between the hard coating layer and the low-refractive layer.

The average particle diameters of the hollow particles and the solid particles may be average values obtained by measuring and calculating particle diameters of the hollow particles and the solid particles confirmed in a transmission electron microscope (TEM) photograph (for example, at a magnification of, 25,000×) of the anti-reflective film, respectively.

The present inventors conducted research into an anti-reflective film and confirmed through experiments that an anti-reflective film including a low-refractive layer containing hollow particles and solid particles having the specific average particle diameter ratio as described above may have a lower reflectance and a high light transmittance and simultaneously implement high scratch resistance and anti-pollution property, thereby completing the present invention.

In a manufacturing process of the low-refractive layer, various factors affecting distribution of the hollow particles and the solid particles, for example, manufacturing conditions, weights or densities of the particles, or the like, may be considered. The present inventors confirmed that in the case of adjusting a difference between the average particle diameters of the two kinds of particles so as to satisfy the above-mentioned ratio, in a finally manufactured anti-reflective film, a lower reflectance may be secured, and improved scratch resistance and anti-pollution property may be implemented.

In more detail, since the ratio of the average particle diameter of the solid particles to the average particle diameter of the hollow particles in the low-refractive layer is 0.55 or less, or 0.15 to 0.55, or 0.26 to 0.55, or 0.27 to 0.40, or 0.280 to 0.380, the hollow particles and the solid particles may be unevenly and differently distributed in the low-refractive layer. For example, regions of the low-refractive layer in which the hollow particles and the solid particles are mainly distributed, respectively, may be positioned at different distances from an interface between the hard coating layer and the low-refractive layer.

As described above, as the regions of the low-refractive layer in which the hollow particles and the solid particles are mainly distributed are different from each other, the low-refractive layer may have a unique internal structure and a unique arrangement pattern of components to thereby have a lower reflectance. In addition, as the regions of the low-refractive layer in which the hollow particles and the solid particles are mainly distributed are different from each other, surface characteristics of the low-refractive layer are also changed together, thereby making it possible to implement further improved scratch resistance and anti-pollution property.

On the contrary, in the case in which the difference between the particle diameters of the hollow particles and the solid particles contained in the low-refractive layer is not very large, the hollow particles and the solid particles may be aggregated with each other or uneven or different distribution depending on the kind of particles may not occur, such that it may be difficult to significantly decrease a reflectance of the anti-reflective film, and it may also be difficult to achieve the desired scratch resistance and anti-pollution property.

As described above, inherent effects of the anti-reflective film according to the exemplary embodiment, for example, effects of having a low reflectance, simultaneously implementing high light transmittance and high scratch resistance and anti-pollution property, and enhancing sharpness of a screen of a display device may originate from the ratio of the average particle diameter of the hollow particles and the average particle diameter of the solid particles as described above.

The solid inorganic nanoparticles mean particles having a shape in which an empty space is not present in the insides thereof.

Further, the hollow inorganic nanoparticles mean nanoparticles having a shape in which an empty space is present on surfaces and/or the insides thereof.

As the ratio of the average particle diameter of the solid particles to the average particle diameter of the hollow particles as described above satisfies a range of 0.55 or less, the anti-reflective film may have a lower reflectance and a high light transmittance and simultaneously implement high scratch resistance and anti-pollution property.

In order to more easily adjust characteristics of the anti-reflective film as described above and satisfy characteristics thereof required in an application field, hollow particles and solid particles having predetermined average particle diameters, respectively, may be used.

For example, in order to allow the anti-reflective film to have a lower reflectance and a high light transmittance and implement high scratch resistance and anti-pollution property, the average particle diameter of hollow particles may be in a range of 40 nm to 100 nm, and the average particle diameter of the solid particles may be in a range of 1 nm to 30 nm.

When the average particle diameter of the hollow inorganic nanoparticles and the solid inorganic nanoparticles satisfies the above-mentioned ratio or the above-mentioned size range, the range of the specific particle diameter is not limited to a large extent. However, in order to obtain a more uniform and improved quality of the antireflection film, the particle size of the hollow inorganic nanoparticles may be in the range of 10 nm to 200 nm, or 30 nm to 120 nm, or 38 nm to 80 nm and the particle size of the solid inorganic nanoparticles may be in the range of 0.1 nm to 100 nm, or 0.5 nm to 50 nm, or 2 nm to 25 nm.

The diameter of the solid inorganic nanoparticles and the hollow inorganic nanoparticles may mean the longest diameter of each of nanoparticles, which is identified on the cross-section.

As long as the average particle diameters of the hollow particles and the solid particles satisfy the above-mentioned ratio or the above-mentioned ranges, respectively, specific ranges of the particle diameters thereof are not particularly limited. However, in order to allow the anti-reflective film to have more uniform and improved quality, the particle diameter of hollow particles may be in a range of 10 nm to 200 nm, or 30 nm to 120 nm, and the particle diameter of the solid particles may also be in a range of 0.1 nm to 100 nm, or 0.5 nm to 50 nm.

Meanwhile, each of the solid inorganic nanoparticles and the hollow inorganic nanoparticles may contain one or more reactive functional groups selected from the group consisting of a hydroxyl group, a (meth)acrylate group, an epoxide group, a vinyl group, and a thiol group on a surface thereof. As each of the solid inorganic nanoparticles and the hollow inorganic nanoparticles contains the above-mentioned reactive functional group on the surface thereof, the low-refractive layer may have a higher cross-linking density, and thus, it is possible to secure further improved scratch resistance and anti-pollution property. In the case which there is no separate substituent, a hydroxyl group may be present in the surface of each of the solid inorganic nanoparticles and the hollow inorganic nanoparticles.

As described above, the anti-reflective film may include the hard coating layer; and the low-refractive layer containing the binder resin, and hollow inorganic nanoparticles and the solid inorganic nanoparticles which are dispersed in the binder resin.

More specifically, in the anti-reflective film, an amount of the solid inorganic nanoparticles distributed closely to the interface between the hard coating layer and the low-refractive layer may be larger than that of the hollow inorganic nanoparticles.

In the past, in order to increase scratch resistance of an anti-reflective film, an excessive amount of inorganic particles was added, but there was a limitation in increasing the scratch resistance of the anti-reflective film, but the reflectance and the anti-pollution property were rather deteriorated.

On the contrary, in the case in which the hollow inorganic nanoparticles and the solid inorganic nanoparticles are distributed in the low-refractive layer included in the anti-reflective film so as to be distinguished from each other, the anti-reflective film may have a low reflectance and a high light transmittance and simultaneously implement high scratch resistance and anti-pollution property.

More specifically, in the case of mainly distributing the solid inorganic nanoparticles in a region of the low-refractive layer of the anti-reflective film close to the interface between the hard coating layer and the low-refractive layer and mainly distributing the hollow inorganic nanoparticles in a region of the low-refractive layer oppose to the interface, it is possible to achieve a reflectance lower than an actual reflectance which could be obtained using the inorganic particles in the past, and the low-refractive layer may simultaneously implement significantly improved scratch resistance and anti-pollution property.

As described above, the low-refractive layer may contain the binder resin and the hollow inorganic nanoparticles and the solid inorganic nanoparticles which are dispersed in the binder resin, and be formed on one surface of the hard coating layer, wherein at least 70 vol % of the entire solid inorganic nanoparticles may be present within a distance corresponding to 50% of an entire thickness of the low-refractive layer from the interface between the hard coating layer and the low-refractive layer.

'At least 70 vol % of the entire solid inorganic nanoparticles are present in a specific region', which means that most of the solid inorganic nanoparticles are present in the specific region in a cross section of the low-refractive layer. In detail, at least 70 vol % of the entire solid inorganic nanoparticles may be confirmed by measuring a total volume of the solid inorganic nanoparticles or though Transmission electron microscope (TEM) or the like.

Whether or not the hollow inorganic nanoparticles and the solid inorganic nanoparticles are present in specific regions may be determined by whether each of the hollow inorganic nanoparticles or each of the solid inorganic nanoparticles is present in the specific region, except for particles present on an interface of the specific region.

Further, as described above, the hollow inorganic nanoparticles may be mainly distributed in the region of the low-refractive layer opposite to the interface between the hard coating layer and low-refractive layer. In detail, at least 30 vol % of the entire hollow inorganic nanoparticles may be present at a distance farther than that of the entire solid inorganic nanoparticles from the interface between the hard coating layer and low-refractive layer in a thickness direction of the low-refractive layer.

In specific, at least 30 vol %, or 50 vol %, or 70 vol % of the entire hollow inorganic nanoparticles may be present in a region of the low-refractive layer at a distance exceeding 50% of the entire thickness of the low-refractive layer from the interface between the hard coating layer and the low-refractive layer (a region within a point exceeding 50% of the total thickness of the low refraction layer from the interface between the hard coat layer and the low-refractive layer and the other surface of the low refraction layer facing the interface).

In more detail, at least 70 vol % of the entire solid inorganic nanoparticles may be present within a distance corresponding to 30% of the entire thickness of the low-refractive layer from the interface between the hard coating layer and the low-refractive layer. In addition, at least 70 vol % of the entire hollow inorganic nanoparticles may be present in a region of the low-refractive layer at a distance exceeding 30% of the entire thickness of the low-refractive layer from the interface between the hard coating layer and the low-refractive layer.

As the solid inorganic nanoparticles are mainly distributed in the region of the low-refractive layer of the anti-reflective film close to the interface between the hard coating layer and the low-refractive layer and the hollow inorganic nanoparticles are mainly distributed in the region of the low-refractive layer oppose to the interface, two or more portions or two or more layers having different refractive indices may be formed in the low-refractive layer, and thus, the reflectance of the anti-reflective film may be decreased.

Specific distribution of the solid inorganic nanoparticles and the hollow inorganic nanoparticles in the low-refractive layer may be obtained by adjusting the ratio of the average particle diameters of the solid inorganic nanoparticles and the hollow inorganic nanoparticles and adjusting a drying temperature of a photocurable resin composition for forming a low-refractive layer, containing the two kinds of nanoparticles as described above in a specific manufacturing method to be described below.

In the case of mainly distributing the solid inorganic nanoparticles in the region of the low-refractive layer of the anti-reflective film close to the interface between the hard coating layer and the low-refractive layer and mainly distributing the hollow inorganic nanoparticles in the region of the low-refractive layer oppose to the interface, it is possible to implement a reflectance lower than a reflectance capable of being obtained using inorganic particles in the past. In detail, the anti-reflective film may have average reflectance of 1.5% or less, 1.0% or less, 0.50% to 1.0%, 0.60% to 0.70%, or 0.62% to 0.67% in a visible light wavelength region of 380 nm to 780 nm.

Meanwhile, in the anti-reflective film according to the exemplary embodiment, the low-refractive layer may include a first layer containing at least 70 vol % of the entire solid inorganic nanoparticles and a second layer containing at least 70 vol % of the entire hollow inorganic nanoparticles, wherein the first layer may be positioned to be closer to the interface between the hard coating layer and the low-refractive layer than the second layer.

As described above, the solid inorganic nanoparticles are mainly distributed in the region of the low-refractive layer of the anti-reflective film close to the interface between the hard coating layer and the low-refractive layer, and the hollow inorganic nanoparticles are mainly distributed in the region of the low-refractive layer opposite to the interface, wherein the regions in which the solid inorganic nanoparticles and the hollow inorganic nanoparticles are mainly distributed, respectively, may form independent layers which may be visibly confirmed in the low-refractive layer.

In addition, the first layer containing at least 70 vol % of the entire solid inorganic nanoparticles may be located within 50% of the total thickness of the low-refractive layer from the interface between the hard coating layer and the low-refractive layer.

More specifically, the first layer containing at least 70 vol % of the entire solid inorganic nanoparticles may be located within 30% of the total thickness of the low refractive layer from the interface between the hard coating layer and the low-refractive layer.

Further, as described above, the hollow inorganic nanoparticles may be mainly distributed in the region of the low-refractive layer opposite to the interface between the hard coating layer and low-refractive layer. In detail, at least 30 vol % of the entire hollow inorganic nanoparticles may be present at a distance farther than that of the entire solid inorganic nanoparticles from the interface between the hard coating layer and low-refractive layer in a thickness direction of the low-refractive layer. Accordingly, as described above, the first layer may be positioned closer to the interface between the hard coating layer and the low-refractive layer than the second layer.

As described above, it can be visually confirmed that each of the first layer and the second layer, in which the solid inorganic nanoparticles and the hollow inorganic nanoparticles are mainly distributed, respectively, is present in the low-refractive layer.

For example, it can be visually confirmed that each of the first layer and the second layer is present in the low refractive layer by using a transmission electron microscope or a scanning electron microscope. Further, the ratio of the solid inorganic nanoparticles and the hollow inorganic nanoparticles distributed in the first layer and the second layer in the low-refractive layer can also be confirmed.

Meanwhile, each of the first layer containing at least 70 vol % of the entire solid inorganic nanoparticles and the second layer containing at least 70 vol % of the entire hollow inorganic nanoparticles share a common optical property in one layer, and thus can be defined as a single layer.

Specifically, at the time of fitting polarization ellipticity measured by ellipsometry for the first layer and the second layer included in the low-refractive layer using a Cauchy model represented by the above General Equation 1, they have specific Cauchy parameters A, B, and C so that the first and second layers can be distinguished from each other.

Also, since the thicknesses of the first layer and the second layer can be derived through fitting the ellipticity of the polarization measured by the ellipsometry with a Cauchy model represented by the above General Equation 1, the first layer and the second layer in the low refractive layer can be defined.

$$n(\lambda) = A + \frac{B}{\lambda^2} + \frac{C}{\lambda^4}$$ [General Equation 1]

In General Equation 1, $n(\lambda)$ is a refractive index at a wavelength of $\lambda$, $\lambda$ is in a range of 300 nm to 1800 nm, and A, B, and C are Cauchy parameters.

Meanwhile, at the time of fitting polarization ellipticity measured by ellipsometry using a Cauchy model represented by the above General Equation 1, the Cauchy parameters A, B, and C may be an average value in one layer.

Accordingly, when there is an interface between the first layer and the second layer, there may be a region where the first layer and the second layer overlap with the Cauchy parameters A, B, and C.

However, even in this case, the thickness and the position of the first layer and the second layer can be specified along the region satisfying the average value of the Cauchy parameters A, B, and C of each of the first layer and the second layer.

For example, at the time of fitting the polarization ellipticity measured by ellipsometry for the first layer included in the low-refractive layer using the Cauchy model represented by General Equation 1, the first layer satisfies the following Conditions: A is 1.0 to 1.65, B is 0.0010 to 0.0350, and C is 0 to $1*10^{-3}$.

In addition, at the time of fitting the polarization ellipticity measured by ellipsometry for the first layer included in the low-refractive layer using the Cauchy model represented by General Equation 1, the first layer satisfies the following conditions: A is 1.30 to 1.55, 1.40 to 1.52, or 1.491 to 1.511, B is 0 to 0.005, 0 to 0.00580, or 0 to 0.00573, and C is 0 to $1*10^{-3}$, 0 to $5.0*10^{-4}$, or 0 to $4.1352*10^{-4}$.

In detail, at the time of fitting the polarization ellipticity measured by ellipsometry for the second layer included in the low-refractive layer using the Cauchy model represented by the following General Equation 1, the second layer may satisfy the following conditions: A is 1.0 to 1.50, B is 0 to 0.007, and C is 0 to $1*10^{-3}$. In addition, at the time of fitting the polarization ellipticity measured by ellipsometry for the second layer included in the low-refractive layer using the Cauchy model represented by the following General Equation 1, the second layer may satisfy the following conditions: A is 1.10 to 1.40, 1.20 to 1.35, or 1.211 to 1.349, B is 0 to 0.007, 0 to 0.00550, or 0 to 0.00513, and C is 0 to $1*10^{-3}$, 0 to $5.0*10^{-4}$, or 0 to $4.8685*10^{-4}$.

In the antireflection film of the embodiment(s) described above, the first layer and the second layer included in the low refractive layer may have refractive indexes in different ranges.

More specifically, the first layer included in the low refraction layer may have a refractive index in a range of 1.420 to 1.600, 1.450 to 1.550, 1.480 to 1.520, or 1.491 to 1.511, at 550 nm.

In addition, the second layer included in the low refractive layer may have a refractive index in a range of 1.200 to 1.410, 1.210 to 1.400, or 1.211 to 1.375, at 550 nm.

The refractive index can be measured by a conventionally known method. For example, the refractive index can be determined by calculating the refractive index at 550 nm based on the elliptically polarized light and the Cauchy model measured at a wavelength of 380 nm to 1000 nm for each of the first layer and the second layer included in the low refractive layer Meanwhile, the low-refractive layer as described above may be manufactured from a photocurable coating composition containing a photopolymerizable compound, a fluorine-containing compound including a photoreactive functional group, the hollow inorganic nanoparticles, the solid inorganic nanoparticles, and a photoinitiator.

Therefore, the binder resin contained in the low-refractive layer may contain a cross-linked (co)polymer between a (co)polymer of the photopolymerizable compound and the fluorine-containing compound including the photoreactive functional group.

The photopolymerizable compound contained in the photocurable coating composition according to the exemplary embodiment may form a substrate of the binder resin of the manufactured low-refractive layer. In detail, the photopolymerizable compound may include a monomer or oligomer including (meth)acrylate or a vinyl group. In more detail, the photopolymerizable compound may include a monomer or oligomer, including at least one, at least two, or at least three (meth)acrylates or vinyl groups.

A specific example of the monomer or oligomer including (meth)acrylate may include pentaerythritol tri(meth)acrylate, pentaerythritol tetra(meth)acrylate, dipentaerythritol penta(meth)acrylate, dipentaerythritol hexa(meth)acrylate, tripentaerythritol hepta(meth)acrylate, trilene diisocyanate, xylene diisocyanate, hexamethylene diisocyanate, trimethylolpropane tri(meth)acrylate, trimethylolpropane polyethoxy tri(meth)acrylate, trimethylolpropane trimethacrylate, ethyleneglycol dimethacrylate, butanediol dimethacrylate, hexaethyl methacrylate, butyl methacrylate, or a mixture of two or more thereof; or an urethane modified acrylate oligomer, an epoxide acrylate oligomer, an etheracrylate oligomer, a dendritic acrylate oligomer, or a mixture of two or more thereof. Here, it is preferable that a molecular weigh of the oligomer is 1,000 to 10,000.

A specific example of the monomer or oligomer including the vinyl group may include divinyl benzene, styrene, or paramethylstyrene.

A content of the photopolymerizable compound in the photocurable coating composition is not particularly limited, but in consideration of mechanical properties, and the like, of a low-refractive layer or anti-reflective film to be finally manufactured, the content of the photopolymerizable compound may be 5 wt % to 80 wt % based on a solid component of the photocurable coating composition. The solid component of the photocurable coating composition means only a solid-state component of the photocurable coating composition except for liquid-state components, for example, an organic solvent, and the like, which may be selectively contained as described below.

Meanwhile, the photopolymerizable compound may further contain a fluorinated (meth)acrylate based monomer or oligomer in addition to the above-mentioned monomer or oligomer. In the case in which the photopolymerizable compound further contains the fluorinated (meth)acrylate based monomer or oligomer, a weight ratio of the fluorinated (meth)acrylate based monomer or oligomer to the monomer or oligomer including the (meth)acrylate or vinyl group may be 0.1% to 10%.

A specific example of the fluorinated (meth)acrylate based monomer or oligomer may include one or more selected from the group consisting of compounds represented by the following Chemical Formulas 1 to 5.

[Chemical Formula 1]

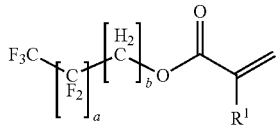

In Chemical Formula 1, R1 is hydrogen or an alkyl group having 1 to 6 carbon atoms, a is an integer of 0 to 7, and b is an integer of 1 to 3.

[Chemical Formula 2]

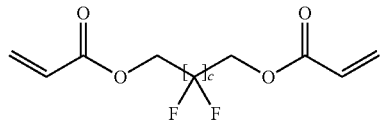

In Chemical Formula 2, c is an integer of 1 to 10.

[Chemical Formula 3]

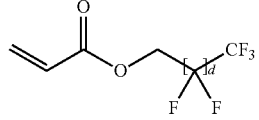

In Chemical Formula 3, d is an integer of 1 to 11.

[Chemical Formula 4]

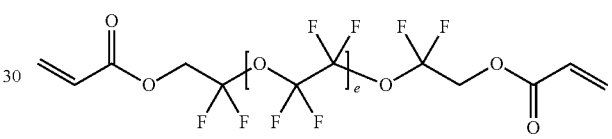

In Chemical Formula 4, e is an integer of 1 to 5.

[Chemical Formula 5]

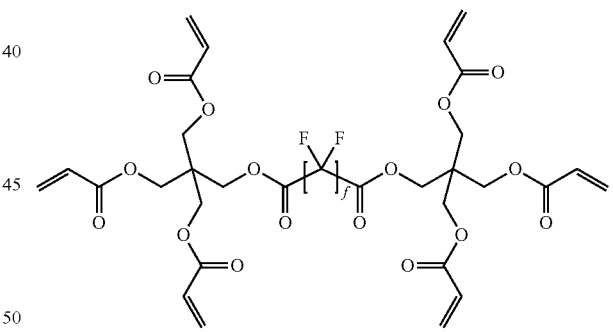

In Chemical Formula 5, F is an integer of 4 to 10.

Meanwhile, a moiety derived from the fluorine-containing compound including the photoreactive functional group may be contained in the low-refractive layer.

One or more photoreactive functional groups may be included or substituted in the fluorine-containing compound including the photoreactive functional group, wherein the photoreactive functional group means a functional group capable of participating in a polymerization reaction by light irradiation, for example, visible light irradiation or UV light irradiation. The photoreactive functional group may include various functional groups known to participate in a polymerization reaction by light irradiation, and a specific example thereof may include a (meth)acrylate group, an epoxide group, a vinyl group, or a thiol group.

Each of the fluorine-containing compounds including the photoreactive functional group may have a weight average molecular weight (weight average molecular weight measured by gel permeation chromatography (GPC) in terms of polystyrene) of 2,000 to 200,000, preferably 5,000 to 100,000.

When the weight average molecular weight of the fluorine-containing compounds including the photoreactive functional group is excessively small, the fluorine-containing compounds in the photocurable coating composition may not be uniformly and effectively arranged on a surface but are positioned inside the finally manufactured low-refractive layer, such that the anti-pollution property of the surface of the low-refractive layer may be deteriorated, and mechanical properties such as entire strength, scratch resistance, and the like, may be deteriorated due to a decrease in the cross-linking density of the low-refractive layer.

Further, when the weight average molecular weight of the fluorine-containing compounds including the photoreactive functional group is excessively large, compatibility with other components in the photocurable coating composition may be deteriorated, such that a haze of the finally manufactured low-refractive layer may be increased or light transmittance thereof may be decreased, and strength of the low-refractive layer may also be deteriorated.

In detail, the fluorine-containing compound including the photoreactive functional group may be i) an aliphatic compound or alicyclic compound in which one or more photoreactive functional groups are substituted, and at least one carbon atom is substituted with one or more fluorine atoms; ii) a hetero aliphatic compound or hetero alicyclic compound in which one or more photoreactive functional groups are substituted, at least one hydrogen atom is substituted with a fluorine atom, and one or more carbon atoms are substituted with a silicon atom; iii) a polydialkylsiloxane based polymer (for example, polydimethylsiloxane based polymer) in which one or more photoreactive functional groups are substituted, and at least one silicon atom is substituted with one or more fluorine atoms; iv) a polyether compound in which one or more photoreactive functional groups are substituted, and at least one hydrogen atom is substituted with a fluorine atom; or a mixture of two or more of i) to iv) or a copolymer thereof.

The photocurable coating composition may contain 20 to 300 parts by weight of the fluorine-containing compound including the photoreactive functional group, based on 100 parts by weight of the photopolymerizable compound.

When an amount of the fluorine-containing compound including the photoreactive functional group is excessively large as compared to the photopolymerizable compound, a coating property of the photocurable coating composition according to the exemplary embodiment may be deteriorated, or the low-refractive layer obtained from the photocurable coating composition may not have sufficient durability or scratch resistance. Further, when the amount of the fluorine-containing compound including the photoreactive functional group is excessively small as compared to the photopolymerizable compound, the low-refractive layer obtained from the photocurable coating composition may not have sufficient mechanical properties such as the anti-pollution property, scratch resistance, or the like.

The fluorine-containing compound including the photoreactive functional group may further contain silicon or a silicon compound. That is, the fluorine-containing compound including the photoreactive functional group may selectively contain silicon or the silicon compound therein. More specifically, a content of silicon in the fluorine-containing compound including the photoreactive functional group may be 0.1 wt % to 20 wt %.

The silicon contained in the fluorine-containing compound including the photoreactive functional group may improve compatibility with other components contained in the photocurable coating composition according to the exemplary embodiment, and thus, the silicon may serve to increase transparency by preventing haze generation in the finally manufacture refractive layer. Meanwhile, when the content of silicon in the fluorine-containing compound including the photoreactive functional group is excessively high, compatibility between other ingredients contained in the photocurable coating composition and the fluorine-containing compound may be rather deteriorated, and thus, the finally manufactured low-refractive layer or anti-reflective film may not have a sufficient light transmittance or anti-reflection performance, such that the anti-pollution property of the surface may also be deteriorated.

The low-refractive layer may contain 100 to 400 parts by weight of the hollow inorganic nanoparticles and 10 to 400 parts by weight of the solid inorganic nanoparticles, based on 100 parts by weigh of the (co)polymer of the photopolymerizable compound.

In the case in which the contents of the hollow inorganic nanoparticles and the solid inorganic nanoparticles in the low-refractive layer are excessively high, in a manufacturing process of the low-refractive layer, the hollow inorganic nanoparticles and the solid inorganic nanoparticles may not be sufficiently phase-separated, but mixedly exist, such that the reflectance may be increased, and the surface may become excessively uneven, such that the anti-pollution property may be deteriorated. Further, in the case in which the contents of the hollow inorganic nanoparticles and the solid inorganic nanoparticles in the low-refractive layer are excessively low, it may be difficult to allow the solid inorganic nanoparticles to be mainly positioned in the region close to the interface between the hard coating layer and the low-refractive layer, and the reflectance of the low-refractive layer may be significantly increased.

The low-refractive layer may have a thickness of 1 nm to 300 nm, or 50 nm to 200 nm, or 85 nm to 300 nm.

Meanwhile, as the hard coating layer, a hard coating layer generally known in the art may be used without limitation.

As an example of the hard coating layer, there is a hard coating layer containing a binder resin containing a photocurable resin, and organic or inorganic fine particles dispersed in the binder resin.

The photocurable resin contained in the hard coating layer, which is a polymer of a photocurable compound capable of causing a polymerization reaction when light such as UV light, or the like, is irradiated, may be a photocurable resin generally used in the art.

In detail, the photocurable resin may include one or more selected from the group consisting of the reactive acrylate oligomer group consisting of an urethane acrylate oligomer, an epoxide acrylate oligomer, polyester acrylate, and polyether acrylate; and the multi-functional acrylate monomer group consisting of dipentaerythritol hexaacrylate, dipentaerythritol hydroxy pentaacrylate, pentaerythritol tetraacrylate, pentaerythritol triacrylate, trimethylene propyl triacrylate, propoxylated glycerol triacrylate, trimethylpropane ethoxy triacrylate, 1,6-dihexanediol acrylate, propoxylated glycero triacrylate, tripropylene glycol diacrylate, and ethylene glycol diacrylate.

A particle diameter of the organic or inorganic fine particles is not specifically limited, but for example, the organic fine particles may have a particle diameter of 1 to 10

μm, and the inorganic fine particles may have a particle diameter of 1 nm to 500 nm, or 1 nm to 300 nm.

The particle diameter of the organic or inorganic fine particles may be defined as a volume average particle diameter.

Specific examples of the organic or inorganic fine particles contained in the hard coating layer are not limited, but may include, for example, organic fine particles made of an acrylic resin, a styrene based resin, an epoxide resin, and a nylon resin, or inorganic fine particles made of silicon oxide, titanium dioxide, indium oxide, tin oxide, zirconium oxide, and zinc oxide.

The binder resin of the hard coating layer further comprises a high-molecular weight (co)polymer having weight average molecular weight of 10,000 or more.

The high-molecular weight (co)polymer may be one or more selected from the group consisting of a cellulose based polymer, an acrylic polymer, a styrene based polymer, an epoxide based polymer, a nylon based polymer, an urethane based polymer, and a polyolefin based polymer.

Meanwhile, as another example of the hard coating layer, there is a hard coating layer containing a binder resin made of a photocurable resin; and an antistatic agent dispersed in the binder resin.

The photocurable resin contained in the hard coating layer, which is a polymer of a photocurable compound capable of causing a polymerization reaction when light such as UV light, or the like, is irradiated, may be a photocurable resin generally used in the art. However, preferably, the photocurable compound may be a multi-functional (meth)acrylate based monomer or oligomer. Here, in view of securing physical properties of the hard coating layer, the number of (meth)acrylate based functional groups is 2 to 10, preferably, 2 to 8, and more preferably 2 to 7. More preferably, the photocurable compound may be one or more selected from the group consisting of pentaerythritol tri(meth)acrylate, pentaerythritol tetra(meth)acrylate, dipentaerythritol penta(meth)acrylate, dipentaerythritol hexa(meth)acrylate, dipentaerythritol hepta(meth)acrylate, tripentaerythritol hepta(meth)acrylate, trilene diisocyanate, xylene diisocyanate, hexamethylene diisocyanate, trimethylolpropane tri(meth)acrylate, and trimethylolpropane polyethoxy tri(meth)acrylate.

The antistatic agent may be a quaternary ammonium salt compound; a pyridinium salt; a cationic compound having 1 to 3 amino groups; an anionic compound such as a sulfonic acid base, a sulfuric acid ester base, a phosphoric acid ester base, a phosphonic acid base, or the like; an amphoteric compound such as an amino acid based or amino sulfuric acid ester based compound, or the like; a non-ionic compound such as an imino alcohol based compound, a glycerine bsed compound, a polyethylene glycol based compound, or the like; an organic metal compound such as metal alkoxide compound containing tin, titanium, etc., or the like; a metal chelate compound such as an acetylacetonate salt of the organic metal compound, or the like; a reaction product or polymer compound of two or more thereof; or a mixture of two or more thereof. Here, the quaternary ammonium salt compound may be a compound having one or more quaternary ammonium salt groups in a molecule, and a low-molecular weight quaternary ammonium salt compound or a high-molecular weight quaternary ammonium salt compound may be used without limitation.

Further, as the antistatic agent, a conductive polymer and metal oxide fine particles may also be used. An example of the conductive polymer includes aromatic conjugated poly(paraphenylene), heterocyclic conjugated polypyrrole, polythiophene, aliphatic conjugated polyacetylene, hetero atom-containing conjugated polyaniline, and mixed type conjugated poly(phenylenevinylene), a double chain conjugated compound, which is conjugated compound having a plurality of conjugated chains in a molecule, a conductive complex in which a conjugated polymer chain is grafted to or block-copolymerized with a saturated polymer, and the like. Further, the metal oxide fine particles may be made of zinc oxide, antimony oxide, tin oxide, cerium oxide, indium tin oxide, indium oxide, aluminum oxide, tin oxide doped with antimony, zinc oxide doped with aluminum, or the like.

The hard coating film containing the binder resin made of the photocurable resin; and the antistatic agent dispersed in the binder resin may further contain one or more compounds selected from the group consisting of an alkoxy silane based oligomer and a metal alkoxide based oligomer.

The alkoxy silane based compound may be is an alkoxy silane based compound generally used in the art, but may be preferably one or more compounds selected from the group consisting of tetramethoxysilane, tetraethoxysilane, tetraisopropoxysilane, methyltrimethoxysilane, methyltriethoxysilane, methacryloxylpropyltrimethoxysilane, glycidoxypropyl trimethoxysilane, and glycidoxypropyl triethoxysilane.

Further, the metal alkoxide based oligomer may be prepared by a sol-gel reaction of a composition containing a metal alkoxide based compound and water. The sol-gel reaction may be carried out by a method equivalent to a preparation method of the alkoxy silane based oligomer described above.

However, since the metal alkoxide based compound may violently react with water, the sol-gel reaction may be carried out by diluting the metal alkoxide based compound in an organic solvent and then slowly dropping water thereinto. Here, it is preferable that a molar ratio (based on a metal ion) of the metal alkoxide compound to water is adjusted in a range of 3 to 170 in consideration of reaction efficiency, or the like.

Here, the metal alkoxide based compound may be one or more compounds selected from the group consisting of titanium tetra-isopropoxide, zirconium isopropoxide, and aluminum isopropoxide.

As another example of the hard coating film, there is an antiglare film having a surface on which an uneven shape is formed, or a film having a surface subjected to antiglare treatment (haze imparting treatment, or the like).

As an example of the hard coating film, there is a hard coating film containing a binder resin containing a photocurable resin and organic or inorganic fine particles dispersed in the binder resin.

The photocurable resin contained in the hard coating layer, which is a polymer of a photocurable compound capable of causing a polymerization reaction when light such as UV light, or the like, is irradiated, may be a photocurable resin generally used in the art.

The organic or inorganic fine particles may have a particle diameter of 1 to 10 μm.

The organic or inorganic fine particles may be organic fine particles made of an acrylic resin, a styrene based resin, an epoxide resin, and a nylon resin, or inorganic fine particles made of silicon oxide, titanium dioxide, indium oxide, tin oxide, zirconium oxide, and zinc oxide.

Meanwhile, the hard coating layer may have a thickness of 0.1 μm to 100 μm.

The anti-reflective film may further include a substrate bonded to the other surface of the hard coating layer. A specific kind or thickness of substrate is not particularly limited, but a substrate known to be used for manufacturing a low-refractive layer or anti-reflective film may be used without limitation. For example, as the substrate, a substrate made of polycarbonate, a cyclo olefin polymer, polyester, triacetyl cellulose, or the like, may be used.

Meanwhile, the low-refractive layer may further contain a silane based compound including one or more reactive functional groups selected from the group consisting of a vinyl group and a (meth)acrylate group.

The silane based compound including one or more reactive functional groups selected from the group consisting of the vinyl group and the (meth)acrylate group may improve mechanical properties, for example, scratch resistance, of the low-refractive layer, due to the reactive functional group. Further, as the low-refractive layer may further contain the silane based compound including one or more reactive functional groups selected from the group consisting of a vinyl group and a (meth)acrylate group, it is possible to secure further improved scratch resistance.

In addition, due to a silane functional group or a silicon atom included in the silane based compound including one or more reactive functional groups selected from the group consisting of the vinyl group and the (meth)acrylate group, it is possible to improve internal characteristics of the low-refractive layer. In more detail, as the silane functional group or the silicon atom included in the silane based compound is uniformly distributed in the low-refractive layer, a lower average reflectance may be implemented, and inorganic fine particles uniformly distributed in the low-refractive layer may be uniformly bound to the photopolymerizable compound due to the silane functional group or the silicon atom, thereby making it possible to improve scratch resistance of the finally manufactured ant-reflective film.

As described above, as the silane based compound including one or more reactive functional groups selected from the group consisting of the vinyl group and the (meth)acrylate group has a chemical structure including both the reactive functional group and the silicon atom, the internal characteristics of the low-refractive layer may be optimized to decrease the refractive index, and thus, the low-refractive layer may implement a low reflectance and a high light transmittance, and secure a uniform cross-linking density to secure more excellent abrasion resistance or scratch resistance.

More specifically, the silane based compound including one or more reactive functional groups selected from the group consisting of the vinyl group and the (meth)acrylate group may contain 100 to 1000 g/mol (equivalent weight) of the reactive functional group.

When a content of the reactive functional group in the silane based compound including one or more reactive functional groups selected from the group consisting of the vinyl group and the (meth)acrylate group is excessively low, it may be difficult to sufficiently improve scratch resistance or mechanical properties of the low-refractive layer.

Meanwhile, when the content of the reactive functional group in the silane based compound including one or more reactive functional groups selected from the group consisting of the vinyl group and the (meth)acrylate group is excessively high, uniformity or dispersibility of the inorganic fine particles in the low-refractive layer may be deteriorated, such that the light transmittance, or the like, of the low-refractive layer may be rather deteriorated.

The silane based compound including one or more reactive functional groups selected from the group consisting of the vinyl group and the (meth)acrylate group may have a weight average molecular weight (weight average molecular weight measured by gel permeation chromatography (GPC) in terms of polystyrene) of 100 to 5,000, or 200 to 3,000.

In detail, the silane based compound including one or more reactive functional groups selected from the group consisting of the vinyl group and the (meth)acrylate group may include one or more reactive functional groups selected from the group consisting of the vinyl group and the (meth)acrylate group, one or more trialkoxysliane groups to which an alkylene group having 1 to 10 carbon atoms are bound, and an organic functional group including an urethane functional group. The trialkoxysilane group may be a functional group in which three alkoxy groups having 1 to 3 carbon atoms are substituted in a silicon compound.

Although a specific chemical structure of the silane based compound including one or more reactive functional groups selected from the group consisting of the vinyl group and the (meth)acrylate group is not limited, a specific example of the silane based compound may include compounds represented by the following Chemical Formulas 11 to 14, but a specific chemical structure thereof is not limited.

[Chemical Formula 11]

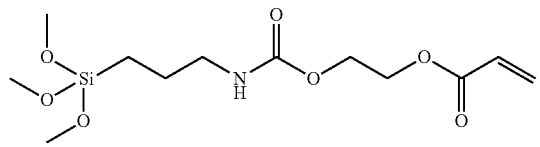

[Chemical Formula 12]

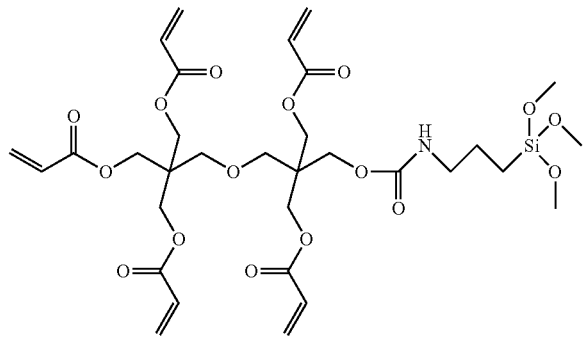

[Chemical Formula 13]

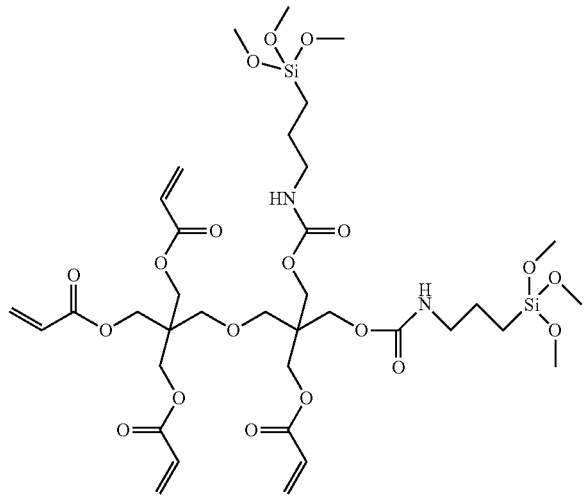

-continued

[Chemical Formula 14]

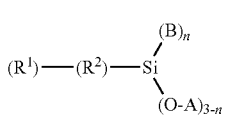

In Chemical Formula 14, $R^1$ is

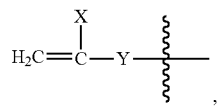

X is any one of hydrogen, a monovalent residue derived from an aliphatic hydrocarbon having 1 to 6 carbon atoms, an alkoxy group having 1 to 6 carbon atoms, and an alkoxycarbonyl group having 1 to 4 carbon atoms, Y is a single bond, —CO—, or —COO—, $R^2$ is a divalent residue derived from aliphatic hydrocarbon having 1 to 20 carbon atoms, a divalent residue in which one or more hydrogen atoms are substituted with a hydroxyl group, a carboxyl group, or an epoxy group, or a divalent residue in which one or more —CH$_2$— groups are replaced with —O—, —CO—O—, —O—CO—, or —O—CO—O— so that oxygen atoms are not directly linked to one another, and A is any one of hydrogen and a monovalent residue derived from aliphatic hydrocarbon having 1 to 6 carbon atoms, B is any one of monovalent residues derived from aliphatic hydrocarbon having 1 to 6 carbon atoms, and n is an integer of 0 to 2.

As an example of the compound represented by Chemical Formula 14, there is a compound represented by Chemical Formula 15.

[Chemical Formula 15]

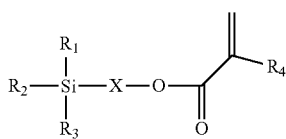

In Chemical Formula 15, $R_1$, $R_2$, and $R_3$ are alkoxy groups having 1 to 3 carbon atoms or hydrogen, X is a straight or branched chain alkylene group having 1 to 10 carbon atoms, and $R_4$ is an alkyl group having 1 to 3 carbon atoms or hydrogen.

The low-refractive layer may contain 2 to 40 parts by weight of the silane based compound including one or more reactive functional groups selected from the group consisting of the vinyl group and the (meth)acrylate group, based on 100 parts by weight of the photopolymerizable compound contained in the low-refractive layer.

When the content of the silane based compound including one or more reactive functional groups selected from the group consisting of a vinyl group and a (meth)acrylate group based on the photopolymerizable compound is excessively low, it may be difficult to sufficiently secure scratch resistance of the low-refractive layer. Further, when the content of the silane based compound including one or more reactive functional groups selected from the group consisting of a vinyl group and a (meth)acrylate group based on the photopolymerizable compound is excessively high, compatibility with other components contained in the low-refractive layer may be significantly deteriorated, such that a haze may occur in the low-refractive layer or the anti-reflective film, or transparence of the low-refractive layer or the anti-reflective film may be significantly deteriorated, and scratch resistance may be rather deteriorated.

Meanwhile, the anti-reflective film according to the exemplary embodiment may be manufactured by a manufacturing method of an anti-reflective film including applying a resin composition for forming a low-refractive layer, containing a photocurable compound or a (co)polymer thereof, a fluorine-containing compound including a photoreactive functional group, a photoinitiator, hollow inorganic nanoparticles, and solid inorganic nanoparticles on a hard coating layer and drying the applied resin composition at a temperature of 35° C. to 100° C.; and photocuring the dried resin composition.

More specifically, in the anti-reflective film manufactured by the manufacturing method of an anti-reflective film described above, the hollow inorganic nanoparticles and the solid inorganic nanoparticles are distributed in the low-refractive layer so as to be distinguished from each other, such that the anti-reflective film may have a low reflectance and a high light transmittance and simultaneously implement high scratch resistance and anti-pollution property.

In more detail, the anti-reflective film may include the hard coating layer; and the low-refractive layer formed on one surface of the hard coating layer and containing the binder resin and the hollow inorganic nanoparticles and the solid inorganic nanoparticles which are dispersed in the binder resin, wherein at least 70 vol % of the entire solid inorganic nanoparticles may be present within a distance corresponding to 50% of an entire thickness of the low-refractive layer from an interface between the hard coating layer and the low-refractive layer.

Further, at least 30 vol % of the entire hollow inorganic nanoparticles may be present at a distance farther than that of the entire solid inorganic nanoparticles from the interface between the hard coating layer and low-refractive layer in a thickness direction of the low-refractive layer.

Further, at least 70 vol % of the entire solid inorganic nanoparticles may be present within a distance corresponding to 30% of the entire thickness of the low-refractive layer from the interface between the hard coating layer and the low-refractive layer. In addition, at least 70 vol % of the entire hollow inorganic nanoparticles may be present in a region of the low-refractive layer at a distance exceeding 30% of the total thickness of the low-refractive layer from the interface between the hard coating layer and the low-refractive layer.

Further, in the anti-reflective film manufactured by the manufacturing method of an anti-reflective film, the low-refractive layer may include a first layer containing at least 70 vol % of the entire solid inorganic nanoparticles and a second layer containing at least 70 vol % 1 of the entire hollow inorganic nanoparticles, wherein the first layer may be positioned to be closer to the interface between the hard coating layer and the low-refractive layer than the second layer.

The low-refractive layer may be formed by applying the resin composition for forming a low-refractive layer, containing the photocurable compound or the (co)polymer thereof, the fluorine-containing compound including the photoreactive functional group, the photoinitiator, the hollow inorganic nanoparticles, and the solid inorganic nanoparticles on the hard coating layer and drying the applied resin composition at a temperature of 35° C. to 100° C. or 40° C. to 80° C.

When a drying temperature of the resin composition for forming a low-refractive layer applied on the hard coating layer is lower than 35° C., an anti-pollution property of the formed low-refractive layer may be significantly deteriorated. Further, when the drying temperature of the resin composition for forming a low-refractive layer applied on the hard coating layer is higher than 100° C., in a manufacturing process of the low-refractive layer, the hollow inorganic nanoparticles and the solid inorganic nanoparticles may not be sufficiently phase-separated, but mixedly exist, such that the scratch resistance and anti-pollution property of the low-refractive layer may be deteriorated, and the reflectance may also be significantly increased.

The low-refractive layer having the-above mentioned characteristics may be formed by adjusting a density difference between the solid inorganic nanoparticles and the hollow inorganic nanoparticles in addition to the drying temperature during a drying process of the resin composition for forming a low-refractive layer applied on the hard coating layer. A density of the solid inorganic nanoparticles may be at least 0.50 g/cm$^3$ larger than that of the hollow inorganic nanoparticles, and due to the density difference, the solid inorganic nanoparticles may be positioned in the low-refractive layer formed on the hard coating layer to be close to the hard coating layer.

Meanwhile, the drying of the resin composition for forming a low-refractive layer, applied on the hard coating layer at a temperature of 35 to 100° C. may be performed for 10 seconds to 5 minutes, or 30 seconds to 4 minutes.

When a drying time is excessively short, a phase separation phenomenon between the hollow inorganic nanoparticles and the solid inorganic nanoparticles described above may not sufficiently occur. On the contrary, when the drying time is excessively long, the formed low-refractive layer may infiltrate into the hard coating layer.

Meanwhile, the low-refractive layer may be manufactured from a photocurable coating composition containing a photocurable compound or a (co)polymer thereof, a fluorine-containing compound including a photoreactive functional group, the hollow inorganic nanoparticles, the solid inorganic nanoparticles, and a photoinitiator.

The low-refractive layer may be obtained by photocuring the resultant obtained by applying the photocurable coating composition on a predetermined substrate. A specific kind or thickness of substrate is not particularly limited, but a substrate known to be used for manufacturing a low-refractive layer or anti-reflective film may be used without limitation.

A method and an apparatus generally used to apply the photocurable coating composition may be used without particular limitation. For example, a bar coating method such as a Meyer bar coating method, or the like, a gravure coating method, a 2-roll reverse coating method, a vacuum slot die coating method, a 2-roll coating method, or the like, may be used.

The low-refractive layer may have a thickness of 1 nm to 300 nm, or 50 nm to 200 nm. Therefore, a thickness of the photocurable coating composition applied on the predetermined substrate may be about 1 nm to 300 nm or 50 nm to 200 nm.

In the photocuring of the photocurable coating composition, UV light or visible light, having a wavelength of 200 to 400 nm, may be irradiated, and at the time of irradiation, it is preferable that an exposure amount is 100 to 4,000 mJ/cm$^2$. An exposure time is not particularly limited, but may be suitably changed depending on a used exposure device, a wavelength of the irradiated light, or the exposure amount.

Further, in the photocuring of the photocurable coating composition, nitrogen purging, or the like, may be performed in order to apply a nitrogen atmosphere condition.

Detailed contents of the photocurable compound, the hollow inorganic nanoparticles, the solid inorganic nanoparticles, and the fluorine-containing compound including the photo-reactive functional group include those in the anti-reflective film according to the exemplary embodiment described above.

Each of the hollow inorganic nanoparticles and the solid inorganic nanoparticles may be contained in the composition as a colloidal phase in which they are dispersed in a predetermined dispersion medium. The colloidal phase containing each of the hollow inorganic nanoparticles and the solid inorganic nanoparticles may contain an organic solvent as the dispersion medium.

A content of the hollow inorganic nanoparticles and a content of the solid inorganic nanoparticles in the colloidal phase may be determined in consideration of a content range of the hollow inorganic nanoparticles and a content range of the solid inorganic nanoparticles in the photocurable coating composition, a viscosity of the photocurable coating composition, or the like. For example, solid contents of the hollow inorganic nanoparticles and the solid inorganic nanoparticles in the colloidal phase may be 5 wt % to 60 wt %, respectively.

Here, an example of the organic solvent used as the dispersion medium may include alcohols such as methanol, isopropylalcohol, ethyleneglycol, butanol, and the like; ketones such as methylethylketone, methylisobutylketone, and the like; aromatic hydrocarbons such as toluene, xylene, and the like; amides such as dimethylformamide, dimethylacetamide, N-methylpyrrolidone, and the like; esters such as ethyl acetate, butyl acetate, gamma-butyrolactone, and the like; ethers such as tetrahydrofuran, 1,4-dioxane, and the like; or a mixture thereof.

As the photoinitiator, any compound may be used without particular limitation as long as it is known to be usable in a photocurable resin composition. More specifically, a benzophenone based compound, an acetophenone based compound, a biimidazole based compound, a triazine based compound, an oxime based compound, or a mixture of two or more thereof may be used.

The photoinitiator may be used in a content of 1 to 100 parts by weight based on 100 parts by weight of the photopolymerizable compound. When the content of the photoinitiator is excessively low, some materials that are not cured in the photocuring of the photocurable coating composition may remain. When the content of the photoinitiator is excessively high, an unreacted initiator may remain as an impurity or a cross-linking density may be decreased, such that mechanical property of a manufactured film may be deteriorated, or a reflectance thereof may be significantly increased.

Meanwhile, the photocurable coating composition may further contain an organic solvent.

A non-restrictive example of the organic solvent may include ketones, alcohols, acetates, and ethers, or a mixture of two or more thereof.

A specific example of the organic solvent as described above may include the ketones such as methylethylketone, methylisobutylketone, acetylacetone, isobutylketone, or the like; the alcohols such as methanol, ethanol, diacetone alcohol, n-propanol, i-propanol, n-butanol, i-butanol, t-butanol, or the like; the acetates such as ethylacetate, i-propylacetate, polyethyleneglycol monomethylether acetate, or the like; the ethers such as tetrahydrofuran, propyleneglycol monomethylether, or the like; or a mixture of two or more thereof.

The organic solvent may be added at the time of mixing each of the components contained in the photocurable coating composition, or be added in a state in which each of the components is dispersed in or mixed with the organic solvent, the organic solvent may be contained in the photocurable coating composition. When a content of the organic solvent in the photocurable coating composition is excessively low, flowability of the photocurable coating composition may be deteriorated, such that defects such as formation of a stripe pattern, or the like, may occur in the finally manufactured film. Further, when the organic solvent is excessively added, a solid content may be decreased, such that coating and film formation may not be sufficiently performed, and thus physical properties or surface characteristics of the film may be deteriorated, and a defect may occur in the drying and curing processes. Therefore, the photocurable coating composition may contain the organic solvent so that a total content of the solid components contained therein is 1 wt % to 50 wt %, or 2 wt % to 20 wt %.

A material of the hard coating layer is not particularly limited as long as it is known to be usable in an anti-reflective film.

In detail, the manufacturing method of an anti-reflective film may further include applying a polymer resin composition for forming a hard coating layer, containing a photocurable compound or a (co)polymer thereof, a photoinitiator, and an antistatic agent on a substrate and photocuring the applied polymer resin composition, and the hard coating layer may be formed by this step.

The components used to form the hard coating layer are the same as those in the anti-reflective film according to the present invention described above.

Further, the polymer resin composition for forming a hard coating layer may further contain one or more compounds selected from the group consisting of an alkoxy silane based oligomer and a metal alkoxide based oligomer.

A method and an apparatus generally used to apply the polymer resin composition for forming a hard coating layer may be used without particular limitation. For example, a bar coating method such as a Meyer bar coating method, or the like, a gravure coating method, a 2-roll reverse coating method, a vacuum slot die coating method, a 2-roll coating method, or the like, may be used.

In the photocuring of the polymer resin composition for forming a hard coating layer, UV light or visible light, having a wavelength of 200 to 400 nm, may be irradiated, and at the time of irradiation, it is preferable that an exposure amount is 100 to 4,000 mJ/cm$^2$. An exposure time is not particularly limited, but may be suitably changed depending on a used exposure device, a wavelength of the irradiated light, or the exposure amount. Further, in the photocuring of the polymer resin composition for forming a hard coating layer, nitrogen purging, or the like, may be performed in order to apply a nitrogen atmosphere condition.

Meanwhile, according to the another exemplary embodiment of the present invention, there is provided an anti-reflective film comprising: a hard coating layer containing a binder resin containing a photocurable resin, and organic or inorganic fine particles dispersed in the binder resin; and a low-refractive layer containing a binder resin and hollow inorganic nanoparticles and solid inorganic nanoparticles which are dispersed in the binder resin, wherein a ratio of an average particle diameter of the solid inorganic nanoparticles to an average particle diameter of the hollow inorganic nanoparticles is 0.15 to 0.55, and wherein at least 70 vol % of the entire solid inorganic nanoparticles are present within a distance corresponding to 50% of an entire thickness of the low-refractive layer from the interface between the hard coating layer and the low-refractive layer.

The present inventors conducted research into an anti-reflective film and confirmed through experiments that an anti-reflective film including a low-refractive layer containing hollow particles and solid particles having the specific average particle diameter ratio as described above may have a lower reflectance and a high light transmittance and simultaneously implement high scratch resistance and anti-pollution property, thereby completing the present invention.

In more detail, since the ratio of the average particle diameter of the solid particles to the average particle diameter of the hollow particles in the low-refractive layer is 0.55 or less, or 0.15 to 0.55, or 0.26 to 0.55, or 0.27 to 0.40, or 0.280 to 0.380, the hollow particles and the solid particles may be unevenly and differently distributed in the low-refractive layer. For example, regions of the low-refractive layer in which the hollow particles and the solid particles are mainly distributed, respectively, may be positioned at different distances from an interface between the hard coating layer and the low-refractive layer.

As described above, as the regions of the low-refractive layer in which the hollow particles and the solid particles are mainly distributed are different from each other, the low-refractive layer may have a unique internal structure and a unique arrangement pattern of components to thereby have a lower reflectance. In addition, as the regions of the low-refractive layer in which the hollow particles and the solid particles are mainly distributed are different from each other, surface characteristics of the low-refractive layer are also changed together, thereby making it possible to implement further improved scratch resistance and anti-pollution property.

The concrete contents about the solid inorganic nanoparticles and the hollow inorganic nanoparticles are as described above in the antireflection film of one embodiment of the present invention.

In the case of mainly distributing the solid inorganic nanoparticles in a region of the low-refractive layer of the anti-reflective film close to the interface between the hard coating layer and the low-refractive layer and mainly distributing the hollow inorganic nanoparticles in a region of the low-refractive layer oppose to the interface, it is possible to achieve a reflectance lower than an actual reflectance which could be obtained using the inorganic particles in the past, and the low-refractive layer may simultaneously implement significantly improved scratch resistance and anti-pollution property.

Specific distribution of the solid inorganic nanoparticles and the hollow inorganic nanoparticles in the low-refractive layer may be obtained by adjusting the ratio of the average particle diameters of the solid inorganic nanoparticles and the hollow inorganic nanoparticles and adjusting a drying temperature of a photocurable resin composition for forming a low-refractive layer, containing the two kinds of nanoparticles as described above in a specific manufacturing method to be described below.

The low-refractive layer may contain the binder resin and the hollow inorganic nanoparticles and the solid inorganic nanoparticles which are dispersed in the binder resin, and be formed on one surface of the hard coating layer, wherein at least 70 vol % of the entire solid inorganic nanoparticles may be present within a distance corresponding to 50% of an entire thickness of the low-refractive layer from the interface between the hard coating layer and the low-refractive layer.

Further, as described above, the hollow inorganic nanoparticles may be mainly distributed in the region of the low-refractive layer opposite to the interface between the hard coating layer and low-refractive layer. In detail, at least 30 vol % of the entire hollow inorganic nanoparticles may be present at a distance farther than that of the entire solid inorganic nanoparticles from the interface between the hard coating layer and low-refractive layer in a thickness direction of the low-refractive layer.

In specific, at least 30 vol %, or 50 vol %, or 70 vol % of the entire hollow inorganic nanoparticles may be present in a region of the low-refractive layer at a distance exceeding 50% of the entire thickness of the low-refractive layer from the interface between the hard coating layer and the low-refractive layer (a region within a point exceeding 50% of the total thickness of the low refraction layer from the interface between the hard coat layer and the low-refractive layer and the other surface of the low refraction layer facing the interface).

In more detail, at least 70 vol % of the entire solid inorganic nanoparticles may be present within a distance corresponding to 30% of the entire thickness of the low-refractive layer from the interface between the hard coating layer and the low-refractive layer. In addition, at least 70 vol % of the entire hollow inorganic nanoparticles may be present in a region of the low-refractive layer at a distance exceeding 30% of the entire thickness of the low-refractive layer from the interface between the hard coating layer and the low-refractive layer.

The hard coating layer contains a binder resin containing a photocurable resin, and organic or inorganic fine particles dispersed in the binder resin.

A particle diameter of the organic or inorganic fine particles is not specifically limited, but for example, the organic fine particles may have a particle diameter of 1 to 10 μm, and the inorganic fine particles may have a particle diameter of 1 nm to 500 nm, or 1 nm to 300 nm.

The more specific details to the binder resin and the organic or inorganic fine particles of the hard coat layer include the above-described contents of the antireflection film of one embodiment of the present invention. In addition, more specific details to the anti-reflection film of another embodiment include the above-mentioned details to the anti-reflection film of one embodiment of the present invention.

Advantageous Effects

According to the present invention, the anti-reflective film capable of having a low reflectance and a high light transmittance, simultaneously implementing high scratch resistance and anti-pollution property, and enhancing sharpness of a screen of a display device, and a manufacturing method thereof may be provided.

BRIEF DESCRIPTION OF THE DRAWINGS

FIG. 1 is a transmission electron microscope (TEM) photograph of a cross section of an anti-reflective film in Example 1.

FIG. 2 is a TEM photograph of a cross section of an anti-reflective film in Example 2.

FIG. 3 is a TEM photograph of a cross section of an anti-reflective film in Example 3.

FIG. 4 is a TEM photograph of a cross section of an anti-reflective film in Example 4.

FIG. 5 is a TEM photograph of a cross section of an anti-reflective film in Example 5.

FIG. 6 is a TEM photograph of a cross section of an anti-reflective film in Comparative Example 6.

FIG. 7 is a TEM photograph of a cross section of an anti-reflective film in Comparative Example 1.

FIG. 8 is a TEM photograph of a cross section of an anti-reflective film in Comparative Example 2.

DETAILED DESCRIPTION OF THE EMBODIMENTS

The present invention will be described in more detail through the following Examples. However, the following Examples are only to exemplify the present invention, and contents of the present invention are not limited by the following Examples.

Preparation Example

Preparation Example: Manufacturing of Hard Coating Film

A salt-type antistatic hard coating solution (KYOEISHA Chemical, solid content: 50 wt %, product name: LJD-1000) was coated on a triacetyl cellulose film using a #10 Mayer bar, dried at 90 degree for 1 minute, and irradiated with UV light (150 mJ/cm$^2$), thereby manufacturing a hard coating film having a thickness of about 5 to 6 μm.

Examples 1 to 5: Manufacturing of Anti-Reflective Film

Example 1

(1) Preparation of Photocurable Coating Composition for Forming Low-Refractive Layer Based on 100 parts by weight of pentaerythritoltriacrylate (PETA), 281 parts by weight of hollow silica nanoparticles (diameter range: about 44 nm to 61 nm, manufactured by JSC catalyst and chemicals), 63 parts by weight of solid silica nanoparticles (diameter range: about 12.7 nm to 17 nm), 131 parts by weight of a first fluorine-containing compound (X-71-1203M, ShinEtsu), 19 parts by weight of a second fluorine-containing compound (RS-537, DIC), and 31 parts by weight of an initiator (Irgacure 127, Ciba) were diluted in a methyl isobutyl ketone (MIBK) solvent so that a solid content was 3 wt %.

(2) Manufacturing of Low-Refractive Layer and Anti-Reflective Film

The photocurable coating composition obtained above was coated on the hard coating film in Preparation Example using a #4 Mayer bar so as to have a thickness of about 110 to 120 nm, and dried and cured at a temperature illustrated in the following Table 1 for a time illustrated in the following Table 1. At the time of curing, the dried coating resultant was irradiated with UV light (252 mJ/cm$^2$) under nitrogen purging.

The longest diameter of 100 to 170 of the hollow silica nanoparticles and the solid silica nanoparticles contained in the formed low refraction layer were measured respectively by using a transmission electron microscope (TEM). After repeating 10 times of the measuring, the average particle diameter of the hollow silica nanoparticles and the solid silica nanoparticles were determined (average diameter of hollow silica nanoparticles: 55.9 nm, average diameter of solid type silica nanoparticles: 14.5 nm).

Example 2

(1) Preparation of Photocurable Coating Composition for Forming Low-Refractive Layer Based on 100 parts by weight trimethylolpropane triacrylate (TMPTA), 283 parts by weight of hollow silica nanoparticles (diameter range: about 42 nm to 66 nm, manufactured by JSC catalyst and chemicals), 59 parts by weight of solid silica nanoparticles (diameter range: about 12 nm to 19 nm), 115 parts by weight of a first fluorine-containing compound (X-71-1203M, ShinEtsu), 15.5 parts by weight of a second fluorine-containing compound (RS-537, DIC), and 10 parts by weight of an initiator (Irgacure 127, Ciba) were diluted in a methyl isobutyl ketone (MIBK) solvent so that a solid content was 3 wt %.

(2) Manufacturing of Low-Refractive Layer and Anti-Reflective Film

The photocurable coating composition obtained above was coated on the hard coating film in Preparation Example using a #4 Mayer bar so as to have a thickness of about 110 to 120 nm, and dried and cured at a temperature illustrated in the following Table 1 for a time illustrated in the following Table 1. At the time of curing, the dried coating resultant was irradiated with UV light (252 mJ/cm$^2$) under nitrogen purging. The longest diameter of 100 to 170 of the hollow silica nanoparticles and the solid silica nanoparticles contained in the formed low refraction layer were measured respectively by using a transmission electron microscope (TEM). After repeating 10 times of the measuring, the average particle diameter of the hollow silica nanoparticles and the solid silica nanoparticles were determined (average diameter of hollow silica nanoparticles: 54.9 nm, average diameter of solid type silica nanoparticles: 14.5 nm).

Example 3

(1) Preparation of Photocurable Coating Composition for Forming Low-Refractive Layer Based on 100 parts by weight of pentaerythritoltriacrylate (PETA), 281 parts by weight of hollow silica nanoparticles (diameter range: about 43 nm to 71 nm, manufactured by JSC catalyst and chemicals), 63 parts by weight of solid silica nanoparticles (diameter range: about 13 nm to 16 nm), 111 parts by weight of a first fluorine-containing compound (X-71-1203M, ShinEtsu), 30 parts by weight of a second fluorine-containing compound (RS-537, DIC), and 23 parts by weight of an initiator (Irgacure 127, Ciba) were diluted in a methyl isobutyl ketone (MIBK) solvent so that a solid content was 3 wt %.

(2) Manufacturing of Low-Refractive Layer and Anti-Reflective Film

The photocurable coating composition obtained above was coated on the hard coating film in Preparation Example using a #4 Mayer bar so as to have a thickness of about 110 to 120 nm, and dried and cured at a temperature illustrated in the following Table 1 for a time illustrated in the following Table 1. At the time of curing, the dried coating resultant was irradiated with UV light (252 mJ/cm$^2$) under nitrogen purging. The longest diameter of 100 to 170 of the hollow silica nanoparticles and the solid silica nanoparticles contained in the formed low refraction layer were measured respectively by using a transmission electron microscope (TEM). After repeating 10 times of the measuring, the average particle diameter of the hollow silica nanoparticles and the solid silica nanoparticles were determined (average diameter of hollow silica nanoparticles: 54.5 nm, average diameter of solid type silica nanoparticles: 19.5 nm).

Example 4

(1) Preparation of Photocurable Coating Composition for Forming Low-Refractive Layer Based on 100 parts by weight of trimethylolpropane triacrylate (TMPTA), 264 parts by weight of hollow silica nanoparticles (diameter range: about 38 nm to 82 nm, manufactured by JSC catalyst and chemicals), 60 parts by weight of solid silica nanoparticles (diameter range: about 15 nm to 19 nm), 100 parts by weight of a first fluorine-containing compound (X-71-1203M, ShinEtsu), 50 parts by weight of a second fluorine-containing compound (RS-537, DIC), and 30 parts by weight of an initiator (Irgacure 127, Ciba) were diluted in a methyl isobutyl ketone (MIBK) solvent so that a solid content was 3 wt %.

(2) Manufacturing of Low-Refractive Layer and Anti-Reflective Film

The photocurable coating composition obtained above was coated on the hard coating film in Preparation Example using a #4 Mayer bar so as to have a thickness of about 110 to 120 nm, and dried and cured at a temperature illustrated in the following Table 1 for a time illustrated in the following Table 1. At the time of curing, the dried coating resultant was irradiated with UV light (252 mJ/cm$^2$) under nitrogen purging. The longest diameter of 100 to 170 of the hollow silica nanoparticles and the solid silica nanoparticles contained in the formed low refraction layer were measured respectively by using a transmission electron microscope (TEM). After repeating 10 times of the measuring, the average particle diameter of the hollow silica nanoparticles and the solid silica nanoparticles were determined (average diameter of hollow silica nanoparticles: 55.4 nm, average diameter of solid type silica nanoparticles: 17.1 nm).

Example 5

(1) Preparation of Photocurable Coating Composition for Forming Low-Refractive Layer Based on 100 parts by weight of pentaerythritoltriacrylate (PETA), 414 parts by weight of hollow silica nanoparticles (diameter range: about 43 nm to 81 nm, manufactured by JSC catalyst and chemicals), 38 parts by weight of solid silica nanoparticles (diameter range: about 14 nm to 19 nm), 167 parts by weight of a fluorine-containing compound (RS-537, DIC), 33 parts by weight of an initiator (Irgacure 127, Ciba), and 110 parts by weight of 3-methacryloxypropylmethyldimethoxysilane (molecular weight: 234.3) were diluted in a methyl isobutyl ketone (MIBK) solvent so that a solid content was 3.2 wt %.

(2) Manufacturing of Low-Refractive Layer and Anti-Reflective Film

The photocurable coating composition obtained above was coated on the hard coating film in Preparation Example using a #4 Mayer bar so as to have a thickness of about 110 to 120 nm, and dried and cured at a temperature illustrated in the following Table 1 for a time illustrated in the following Table 1. At the time of curing, the dried coating resultant was irradiated with UV light (252 mJ/cm$^2$) under nitrogen purging. The longest diameter of 100 to 170 of the hollow silica nanoparticles and the solid silica nanoparticles contained in the formed low refraction layer were measured respectively by using a transmission electron microscope (TEM). After repeating 10 times of the measuring, the average particle diameter of the hollow silica nanoparticles and the solid silica nanoparticles were determined (average diameter of hollow silica nanoparticles: 55.5 nm, average diameter of solid type silica nanoparticles: 17.1 nm).

Example 6

(1) Preparation Example: Manufacturing of Hard Coating Film (HD2)

30 g of pentaerythritol triacrylate, 2.5 g of high molecular weight copolymer (BEAMSET 371, Arakawa Co., Epoxy Acrylate, molecular qverage weight 40,000), 20 g of methyl ethyl ketone, and 0.5 g of leveling agent (Tego wet 270) were uniformy mixed. After that, 2 g of an acrylic-styrene copolymer (volume average particle diameter: 2 µm, manufacturer: Sekisui Plastic) as fine particles having a particle diameter of 1.525 was added into the mixture, and a hard coating composition was prepared.

The hard coating composition obtained above was coated on a triacetylcellulose film using a #10 Mayer bar, and dried and cured at 90° C. for 1 minute. At the time of curing, the dried coating resultant was irradiated with UV light (150 mJ/cm$^2$) under nitrogen purging, and a hard coating film having a thickness of 5 mu m was prepared.

(2) Preparation of Photocurable Coating Composition for Forming Low-Refractive Layer Based on 100 parts by weight of Trimethylolpropane triacrylate (TMPTA), 283 parts by weight of hollow silica nanoparticles (diameter range: about 40 nm to 68 nm, manufactured by JSC catalyst and chemicals), 59 parts by weight of solid silica nanoparticles (diameter range: about 14 nm to 17 nm), 115 parts by weight of a first fluorine compound (X-71-1203M, ShinEtsu), 15.5 parts by weight of a second fluorine compound (RS-537, manufactured by DIC Corporation), and 10 parts by weight of an initiator (Irgacure 127) were diluted in a methyl isobutyl ketone (MIBK) solvent so that a solid content was 3.2 wt %.

The photocurable coating composition obtained above was coated on the hard coating film (HD2) using a #4 Mayer bar so as to have a thickness of about 110 to 120 nm, and dried and cured at a temperature of 60° C. for 1 minute to form a low refractive layer to prepare an antireflection film. At the time of curing, the dried coating resultant was irradiated with UV light (252 mJ/cm$^2$) under nitrogen purging. The longest diameter of 100 to 170 of the hollow silica nanoparticles and the solid silica nanoparticles contained in the formed low refraction layer were measured respectively by using a transmission electron microscope (TEM). After repeating 10 times of the measuring, the average particle diameter of the hollow silica nanoparticles and the solid silica nanoparticles were determined (average diameter of hollow silica nanoparticles: 55.4 nm, average diameter of solid type silica nanoparticles: 14.7 nm).

TABLE 1

| | Drying temperature (° C.) | Drying Time |
|---|---|---|
| Example 1 | 40 | 1 min |
| Example 2 | 60 | 1 min |
| Example 3 | 80 | 1 min |
| Example 4 | 60 | 2 min |
| Example 5 | 60 | 1 min |
| Example 6 | 60 | 1 min |

Comparative Example: Manufacturing of Anti-Reflective Film

Comparative Example 1

An anti-reflective film was manufactured by the same method as in Example 1 except for using solid silica nanoparticles (diameter range: about 34 nm to 80 nm).

The longest diameter of 100 to 170 of the hollow silica nanoparticles and the solid silica nanoparticles contained in the formed low refraction layer were measured respectively by using a transmission electron microscope (TEM). After repeating 10 times of the measuring, the average particle diameter of the hollow silica nanoparticles and the solid silica nanoparticles were determined (average diameter of hollow silica nanoparticles: 54.6 nm, average diameter of solid type silica nanoparticles: 53.2 nm).

Comparative Example 2

An anti-reflective film was manufactured by the same method as in Example 2 except for using solid silica nanoparticles (diameter range: about 36 nm to 48 nm)

The longest diameter of 100 to 170 of the hollow silica nanoparticles and the solid silica nanoparticles contained in the formed low refraction layer were measured respectively by using a transmission electron microscope (TEM). After repeating 10 times of the measuring, the average particle diameter of the hollow silica nanoparticles and the solid silica nanoparticles were determined (average diameter of hollow silica nanoparticles: 54.5 nm, average diameter of solid type silica nanoparticles: 41.1 nm).

Experimental Example: Measurement of Physical Properties of Anti-Reflective Film Experiments composed of the following categories were performed on the anti-reflective films obtained in Examples and Comparative Examples.

1. Measurement of Average Reflectance of Anti-Reflective Film

Average reflectances of the anti-reflective films obtained in Examples and Comparative Examples in a visible light region (380 to 780 nm) were measured using Solidspec 3700 (SHIMADZU).

2. Measurement of Anti-Pollution Property

An anti-pollution property was measured by drawing a straight line having a length of 5 cm on surfaces of the anti-reflective films obtained in Examples and Comparative Examples using a black name pen and confirming the number of scrubbing actions required for erasing the straight line at the time of scrubbing the antireflective film with a wiper.

Measurement Standard

◯: The number of rubbing actions required for erasing the straight line was 10 or less.

Δ: The number of rubbing actions required for erasing the straight line was 11 to 20.

X: The number of rubbing actions required for erasing the straight line was more than 20.

3. Measurement of Scratch Resistance

A steel wool was rubbed on surfaces of the anti-reflective films obtained in Examples and Comparative Examples while applying a load thereto and reciprocating the anti-reflective film at a rate of 27 rpm 10 times. A maximum load at which the number of scratch (1 cm or less) observed by the naked eyes was 1 or less was measured.

TABLE 2

| | Average reflectance (%) | Scratch Resistance (g) | Anti-pollution Property | Phase-separation |
|---|---|---|---|---|
| Example1 | 0.63 | 500 | ◯ | ◯ |
| Example2 | 0.62 | 500 | ◯ | ◯ |
| Example3 | 0.67 | 500 | ◯ | ◯ |
| Example4 | 0.64 | 500 | ◯ | ◯ |
| Example5 | 0.63 | 500 | ◯ | ◯ |
| Example6 | 0.65 | 500 | ◯ | ◯ |
| Comparative Example1 | 0.80 | 50 | X | X |
| Comparative Example2 | 0.82 | 50 | X | X |

As illustrated in Table 2, it was confirmed that in the low-refractive layers of the anti-reflective films in Examples 1 to 6, a ratio of the particle diameter of the solid particles to the particle diameter of the hollow particles contained therein was 0.55 or less, and thus, the anti-reflective films may have low reflectance of 0.70% or less in the visible light region, and simultaneously implement high scratch resistance and anti-pollution property.

Further, as illustrated in FIGS. 1 to 6, it was confirmed that in the low-refractive layers of the anti-reflective films in Examples 1 to 4, phase separation between the hollow inorganic nanoparticles and the solid inorganic nanoparticles occurred, most of the solid inorganic nanoparticles were present and concentrated toward an interface between the hard coating layer and the low-refractive layer of the anti-reflective film, and most of the hollow inorganic nanoparticles were present and concentrated in a region far from the hard coating layer.

As illustrated in Table 2, it was confirmed that in the low-refractive layers of the anti-reflective films in Comparative Examples 1 and 2, a ratio of the particle diameter of the solid particles to the particle diameter of the hollow particles was more than 0.55, and as illustrated in FIGS. 7 and 8, the hollow inorganic nanoparticles and the solid inorganic nanoparticles were not phase-separated, but mixedly existed.

In addition, as illustrated in Table 2, it was confirmed that reflectances were relatively high, and low scratch resistance and anti-pollution property were exhibited.

What is claimed is:

1. An anti-reflective film comprising:
   a hard coating layer; and
   a low refractive layer containing a binder resin and hollow inorganic nanoparticles and solid inorganic nanoparticles which are dispersed in the binder resin,
   wherein a ratio of an average particle diameter of the solid inorganic nanoparticles to an average particle diameter of the hollow inorganic nanoparticles is 0.26 to 0.55,
   wherein the low-refractive layer includes the hollow inorganic nanoparticles in a higher amount by weight than the solid inorganic nanoparticles, and
   wherein at least 70 vol % of the entire solid inorganic nanoparticles are present within a distance corresponding to 50% of an entire thickness of the low-refractive layer from the interface between the hard coating layer and the low-refractive layer.

2. The anti-reflective film of claim 1, wherein: at least 30 vol % of the entire hollow inorganic nanoparticles are present in a region of the low-refractive layer at a distance exceeding 50% of the entire thickness of the low-refractive layer from the interface between the hard coating layer and the low-refractive layer.

3. The anti-reflective film of claim 1, wherein: the average particle diameter of the hollow particles is in a range of 40 nm to 100 nm, and a particle diameter of the hollow particles is in a range of 10 nm to 200 nm.

4. The anti-reflective film of claim 1, wherein: the average particle diameter of the solid particles is in a range of 1 nm to 30 nm, and a particle diameter of the solid particles is in a range of 0.1 nm to 100 nm.

5. The anti-reflective film of claim 1, wherein: the solid inorganic nanoparticles are further distributed in a region close to an interface between the hard coating layer and the low-refractive layer than the hollow inorganic nanoparticles.

6. The anti-reflective film of claim 1, wherein: at least 70 vol % of the entire solid inorganic nanoparticles are present within a distance corresponding to 50% of an entire thickness of the low-refractive layer from an interface between the hard coating layer and the low-refractive layer.

7. The anti-reflective film of claim 1, wherein: at least 30 vol % of the entire hollow inorganic nanoparticles are present at a distance farther than that of the entire solid inorganic nanoparticles from an interface between the hard coating layer and low-refractive layer in a thickness direction of the low-refractive layer.

8. The anti-reflective film of claim 1, wherein: at least 70 vol % of the entire solid inorganic nanoparticles are present within a distance corresponding to 30% of an entire thickness of the low-refractive layer from an interface between the hard coating layer and the low-refractive layer.

9. The anti-reflective film of claim 8, wherein: at least 70 vol % of the entire hollow inorganic nanoparticles are present at a distance exceeding 30% of an entire thickness of the low-refractive layer from an interface between the hard coating layer and the low-refractive layer.

10. The anti-reflective film of claim 1, wherein: the low-refractive layer includes a first layer containing at least 70 vol % of the entire solid inorganic nanoparticles and a second layer containing at least 70 vol % of the entire hollow inorganic nanoparticles, the first layer being positioned to be closer to an interface between the hard coating layer and the low-refractive layer than the second layer.

11. The anti-reflective film of claim 1, wherein: each of the solid inorganic nanoparticles and the hollow inorganic nanoparticles contains one or more reactive functional groups selected from the group consisting of a hydroxyl group, a (meth)acrylate group, an epoxide group, a vinyl group, and a thiol group on a surface thereof.

12. The anti-reflective film of claim 1, wherein: the binder resin contained in the low-refractive layer contains a cross-linked (co)polymer between a (co)polymer of a photopolymerizable compound and a fluorine-containing compound including a photoreactive functional group.

13. The anti-reflective film of claim 12, wherein: the low-refractive layer contains 10 to 400 parts by weight of the hollow inorganic nanoparticles and 10 to 400 parts by weight of the solid inorganic nanoparticles, based on 100 parts by weight of the (co)polymer of the photopolymerizable compound.

14. The anti-reflective film of claim 1, wherein: the low-refractive layer further contains a silane based compound including one or more reactive functional groups selected from the group consisting of a vinyl group and a (meth)acrylate group.

15. The anti-reflective film of claim 14, wherein: the silane based compound including one or more reactive functional groups selected from the group consisting of the vinyl group and the (meth)acrylate group has a weight average molecular weight of 100 to 5,000.

16. The anti-reflective film of claim 14, wherein the silane based compound contains 100 to 1000 g/mol equivalent weight of the reactive functional group.

17. The anti-reflective film according to claim 1, wherein the hard coating layer contains a binder resin containing a photocurable resin, and organic or inorganic fine particles dispersed in the binder resin.

18. The anti-reflective film according to claim 1, wherein the hard coating layer contains a binder resin containing a photocurable resin, and organic fine particles having a particle diameter of 1 to 10 μm or inorganic fine particles having a particle diameter of 1 nm to 500 nm.

19. The anti-reflective film according to claim 1, wherein the film has a reflectance of 0.70% or less in a wavelength region from 380 nm to 780 nm.

20. An anti-reflective film comprising:
a hard coating layer containing a binder resin containing a photocurable resin, and organic or inorganic fine particles dispersed in the binder resin; and
a low-refractive layer containing a binder resin and hollow inorganic nanoparticles and solid inorganic nanoparticles which are dispersed in the binder resin,
wherein a ratio of an average particle diameter of the solid inorganic nanoparticles to an average particle diameter of the hollow inorganic nanoparticles is 0.15 to 0.55,
wherein the low-refractive layer includes the hollow inorganic nanoparticles in a higher amount by weight than the solid inorganic nanoparticles, and
wherein at least 70 vol % of the entire solid inorganic nanoparticles are present within a distance corresponding to 50% of an entire thickness of the low-refractive layer from the interface between the hard coating layer and the low-refractive layer.

21. The anti-reflective film according to claim 20, wherein at least 30 vol % of the entire hollow inorganic nanoparticles are present at a distance exceeding 50% of an entire thickness of the low-refractive layer from an interface between the hard coating layer and the low-refractive layer.

22. The anti-reflective film according to claim 20, wherein the organic fine particles have a particle diameter of 1 to 10 μm, and the inorganic fine particles have a particle diameter of 1 nm to 500 nm.

23. The anti-reflective film according to claim 20, wherein the film has a reflectance of 0.70% or less in a wavelength region from 380 nm to 780 nm.

24. The anti-reflective film of claim 20, wherein: the low-refractive layer further contains a silane based compound including one or more reactive functional groups selected from the group consisting of a vinyl group and a (meth)acrylate group.

25. The anti-reflective film of claim 24, wherein the silane based compound contains 100 to 1000 g/mol equivalent weight of the reactive functional group.

* * * * *